United States Patent
Shimada et al.

(10) Patent No.: US 10,287,409 B2
(45) Date of Patent: May 14, 2019

(54) ANION EXCHANGE RESIN, ELECTROLYTE MEMBRANE FOR FUEL CELL, BINDER FOR FORMING ELECTRODE CATALYST LAYER, BATTERY ELECTRODE CATALYST LAYER AND FUEL CELL

(71) Applicants: TAKAHATA PRECISION JAPAN CO., LTD., Fuefuki-shi, Yamanashi (JP); UNIVERSITY OF YAMANASHI, Kofu-shi, Yamanashi (JP)

(72) Inventors: Manai Shimada, Fuefuki (JP); Naoki Yokota, Fuefuki (JP); Kenji Miyatake, Kofu (JP); Masahiro Watanabe, Kofu (JP); Junpei Miyake, Kofu (JP); Hideaki Ono, Gamo-gun (JP); Eriko Nishino, Gamo-gun (JP); Koichiro Asazawa, Shiga (JP)

(73) Assignees: TAKAHATA PRECISION JAPAN CO., LTD., Fuefuki (JP); UNIVERSITY OF YAMANASHI, Kofu (JP)

( * ) Notice: Subject to any disclaimer, the term of this patent is extended or adjusted under 35 U.S.C. 154(b) by 213 days.

(21) Appl. No.: 15/505,606

(22) PCT Filed: Aug. 22, 2015

(86) PCT No.: PCT/JP2015/073636
§ 371 (c)(1),
(2) Date: Feb. 21, 2017

(87) PCT Pub. No.: WO2016/027902
PCT Pub. Date: Feb. 25, 2016

(65) Prior Publication Data
US 2017/0267823 A1 Sep. 21, 2017

(30) Foreign Application Priority Data
Aug. 22, 2014 (JP) .................. 2014-168925

(51) Int. Cl.
*C08J 5/22* (2006.01)
*C08G 61/10* (2006.01)
(Continued)

(52) U.S. Cl.
CPC ............ *C08J 5/2281* (2013.01); *C08G 61/10* (2013.01); *C08G 61/12* (2013.01); *C08G 65/40* (2013.01); *C08G 75/02* (2013.01); *C08J 5/2262* (2013.01); *H01B 1/122* (2013.01); *H01M 4/8668* (2013.01); *H01M 4/9008* (2013.01);
(Continued)

(58) Field of Classification Search
CPC .... C08J 5/2281; C08J 5/2262; C08J 2365/00; C08J 2365/02; C08G 61/10; C08G 61/12; C08G 65/40; C08G 75/02; C08G 2261/143; C08G 2261/146; C08G 2261/312; C08G 2261/3424; C08G 2261/344; C08G 2261/412; C08G 2261/516; C08G 2261/598; C08G 2261/62; H01B 1/122; H01M 4/8668; H01M 4/9008; H01M 8/06; H01M 8/1023; H01M 8/1025; H01M 8/103; H01M 8/1032; H01M 8/1034; H01M 8/1037; H01M 8/1036; H01M 2004/026; Y02P 70/56
See application file for complete search history.

(56) References Cited

U.S. PATENT DOCUMENTS

| | | | |
|---|---|---|---|
| 7,973,088 B2 * | 7/2011 | Ikeuchi .................. | C08J 5/2256 204/192.33 |
| 2009/0117438 A1 * | 5/2009 | Saito ...................... | C08J 5/2256 429/493 |

(Continued)

FOREIGN PATENT DOCUMENTS

| JP | 2013-505825 | 2/2013 |
|---|---|---|
| JP | 2013-047309 A | 3/2013 |

(Continued)

OTHER PUBLICATIONS

Park, D.-H., Kohl, P.A., Beckham, H.W.—Anion-Conductive Multiblock Aromatic Copolymer Membranes::Structure-Property Relationships, J. Phys.Chem, C 2013, 117, pp. 15468-15477 (Year: 2013).*
Wang, W., Wang, S., Li, W., Xie, X., Iv, Y.—Synthesis and characterization of fluorinated cross-linked anion exchange membrane, International Journal of Hydrogen Energy 38 (2013), pp. 11045-11052 (Year: 2013).*

(Continued)

*Primary Examiner* — Anca Eoff
(74) *Attorney, Agent, or Firm* — Masuvalley & Partners

(57) ABSTRACT

The present invention provides an anion exchange resin capable of producing an electrolyte membrane for a fuel cell, a binder for forming an electrode catalyst layer and a battery electrode catalyst layer. The anion exchange resin of the present invention has a hydrophobic unit, a hydrophilic unit and divalent fluorine-containing groups. The hydrophobic unit has divalent hydrophobic groups composed of one aromatic ring or a plurality of aromatic rings that are repeated via carbon-carbon bond. The hydrophilic unit has divalent hydrophilic groups composed of one aromatic ring or a plurality of aromatic rings, at least one of which has an anion exchange group, that are repeated via carbon-carbon bond. The divalent fluorine-containing groups have a specific structure and are bonded via carbon-carbon bond to the hydrophobic unit and/or the hydrophilic unit and/or a moiety other than these units.

15 Claims, 3 Drawing Sheets

(51) Int. Cl.

| | |
|---|---|
| *C08G 61/12* | (2006.01) |
| *C08G 65/40* | (2006.01) |
| *H01M 8/1025* | (2016.01) |
| *H01M 8/1032* | (2016.01) |
| *H01M 8/1034* | (2016.01) |
| *H01M 8/1037* | (2016.01) |
| *C08G 75/02* | (2016.01) |
| *H01M 8/06* | (2016.01) |
| *H01B 1/12* | (2006.01) |
| *H01M 4/86* | (2006.01) |
| *H01M 4/90* | (2006.01) |
| *H01M 8/1067* | (2016.01) |
| *H01M 8/1023* | (2016.01) |
| *H01M 8/103* | (2016.01) |
| *H01M 4/02* | (2006.01) |

(52) U.S. Cl.
CPC .............. *H01M 8/06* (2013.01); *H01M 8/103* (2013.01); *H01M 8/1023* (2013.01); *H01M 8/1025* (2013.01); *H01M 8/1032* (2013.01); *H01M 8/1034* (2013.01); *H01M 8/1037* (2013.01); *H01M 8/1067* (2013.01); *C08G 2261/143* (2013.01); *C08G 2261/146* (2013.01); *C08G 2261/312* (2013.01); *C08G 2261/344* (2013.01); *C08G 2261/3424* (2013.01); *C08G 2261/412* (2013.01); *C08G 2261/516* (2013.01); *C08G 2261/598* (2013.01); *C08G 2261/62* (2013.01); *C08J 2365/00* (2013.01); *C08J 2365/02* (2013.01); *H01M 2004/026* (2013.01); *Y02P 70/56* (2015.11)

(56) References Cited

U.S. PATENT DOCUMENTS

| | | | |
|---|---|---|---|
| 2012/0238648 A1* | 9/2012 | Zhou | B01J 49/00 |
| | | | 521/27 |
| 2014/0106218 A1* | 4/2014 | Lee | C08F 220/06 |
| | | | 429/217 |

FOREIGN PATENT DOCUMENTS

| | | |
|---|---|---|
| JP | 2013-533364 A | 8/2013 |
| WO | 2014/050928 A1 | 4/2014 |
| WO | 2015/141450 A1 | 9/2015 |

OTHER PUBLICATIONS

Yokota, N., Ono, H., Miyake, J., Nishino, E., Asazawa, K., Watanabe, M., Miyatake, K.—Anion Conductive Aromatic Block Copolymers Containing Diphenyl Ether or Sulfide Groups for Application to Alkaline Fuel Cells, Appl. Mater. Interfaces 2014, 6, pp. 17044-17052 (Year: 2014).*

Oho, H., Miyake, J., Shimada, S., Uchida, M., Miyatake, K.—Anion exchange membranes composed of perfluoroalkylene chains and ammonium-functionalized oligophenylenes, Journals of Materials Chemistry A, 2015, 3, pp. 21779-21788, published on Sep. 17, 2015 (Year: 2015).*

ISA/JP, International Search Report dated Nov. 17, 2015 in International Application No. PCT/JP2015/073636, total 5 pages with translation.

Jeff W. Labadie & James L. Hedrick, "Perfluoroalkylene-activated poly(aryl ether) synthesis", Macromolecules, 1990, vol. 23, No. 26, p. 5371-5373.

* cited by examiner

|  | QPE-bI-10r | IEC (meq/g) |
|---|---|---|
| ○ | (p1m0.86) | 1.52 |
| □ | (p1m3.13) | 1.41 |

|  | QPAF6-1 | IEC (meq/g) |
|---|---|---|
| ⊚ | (l1m1.10n0) | 1.19 |
| ⊡ | (l1m0.88n0.22) | 1.32 |
| △ | (l1m0.48n0.62) | 1.11 |
| ◇ | (l1m0.240n.86) | 0.85 |

ANION EXCHANGE RESIN, ELECTROLYTE MEMBRANE FOR FUEL CELL, BINDER FOR FORMING ELECTRODE CATALYST LAYER, BATTERY ELECTRODE CATALYST LAYER AND FUEL CELL

RELATED APPLICATIONS

The present invention is the U.S. National Phase of, and claims priority to, International Patent Application No. PCT/JP2015/073636 filed Aug. 22, 2015, which claims priority to Japanese Patent Application No. JP 2014-168925 filed Aug. 22, 2014; all of which are incorporated herein by reference in their entireties.

TECHNICAL FIELD

The present invention relates to an anion exchange resin, an electrolyte membrane for a fuel cell, a binder for forming an electrode catalyst layer, a battery electrode catalyst layer, and a fuel cell.

BACKGROUND ART

It is known that an anion exchange resin comprises: divalent hydrophobic groups being composed of a plurality of aromatic rings which are bonded to each other via a divalent saturated hydrocarbon group; divalent binding groups being composed of one aromatic ring, or being composed of a plurality of aromatic rings which are bonded to each other via carbon-carbon bond; and divalent hydrophilic groups having a plurality of aromatic rings which are bonded to each other via a divalent saturated hydrocarbon group to which an aromatic ring having an anion exchange group is bonded via carbon-carbon bond; wherein the divalent hydrophobic groups and the divalent binding groups are bonded repeatedly via ether bond to form a hydrophobic unit; wherein the divalent hydrophilic group and the divalent binding group are bonded repeatedly via ether bond to form a hydrophilic unit; and wherein the hydrophobic unit and the hydrophilic unit are bonded via ether bond (Patent Document 1).

PATENT DOCUMENT

Patent Document 1: JP 2013-47309 A

SUMMARY OF THE INVENTION

Problem to be Solved by the Invention

However, there is a problem that the anion exchange resin described in Patent Document 1 has insufficient chemical stability (durability, particularly, alkali resistance). While the chemical stability can be improved by exchanging ether bond surrounding an anion exchange group contained in the anion exchange resin described in Patent Document 1 for carbon-carbon bond, the mechanical properties (flexibility) and the solubility, which are inherent advantages of the ether bond, are decreased.

Accordingly, an object of the present invention is to provide an anion exchange resin being capable of producing an electrolyte membrane for a fuel cell, a binder for forming an electrode catalyst layer and a battery electrode catalyst layer, which have improved chemical properties (durability and alkali resistance) and mechanical properties (in particular, flexibility in thin film), an electrolyte membrane for a fuel cell and a binder for forming an electrode catalyst layer which are produced from the anion exchange resin, a battery electrode catalyst layer which is produced from the anion exchange resin, and a fuel cell which has the electrolyte membrane or the electrode catalyst layer.

Means of Solving the Problem

In order to solve the problems, the anion exchange resin of the present invention comprises:

divalent hydrophobic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond;

divalent hydrophilic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, the aromatic ring or at least one of the aromatic rings having an anion exchange group; and a divalent fluorine-containing group as shown in the following formula (1);

wherein the divalent hydrophobic groups are repeated via ether bond, thioether bond, or carbon-carbon bond to form a hydrophobic unit;

wherein the divalent hydrophilic groups are repeated via ether bond, thioether bond, or carbon-carbon bond to form a hydrophilic unit;

wherein the hydrophobic unit and the hydrophilic unit are bonded via ether bond, thioether bond, or carbon-carbon bond; and wherein the divalent fluorine-containing group as shown in the formula (1) is bonded via ether bond, thioether bond, a carbon-silicon bond, or carbon-carbon bond in the main chain or main chains of the hydrophobic unit and/or the hydrophilic unit.

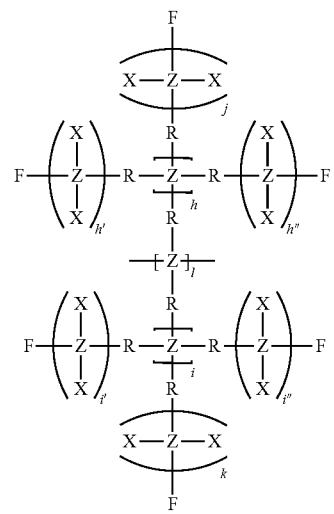

(1)

(In the formula, each Z is the same or different and represents carbon atom or silicon atom; each R is the same or different and represents a silicon-containing group, a nitrogen-containing group, a phosphorus-containing group, an oxygen-containing group, a sulfur-containing group, or direct bond; each X is the same or different and represents a halogen atom, a pseudohalide, or a hydrogen atom; l represents an integer of 1 or more; and h, h', h", i", j, and k are the same or different and represent an integer of 0 or more.)

In the anion exchange resin of the present invention, each of the hydrophilic groups preferably comprises a bisphenol residue which may be substituted with a halogen atom, a pseudohalide, or an alkyl group, as shown in the following formula (2).

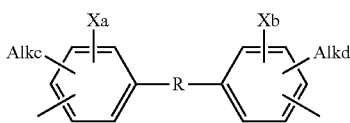

(2)

(In the formula, R represents a hydrocarbon group, a silicon-containing group, a nitrogen-containing group, a phosphorus-containing group, an oxygen-containing group, a sulfur-containing group, an aromatic group, or direct bond; each Alk is the same or different and represents an alkyl group; each X is the same or different and represents a halogen atom or a pseudohalide; and a, b, c, and d are the same or different and represent an integer of 0 to 4.)

In the anion exchange resin of the present invention, each of the hydrophilic groups preferably comprises:

a bisphenol fluorene residue substituted with a substituent group having the anion exchange group, as shown in the following formula (3), and/or an o-, m- or p-phenylene group substituted with a substituent group having the anion exchange group, as shown in the following formula (3').

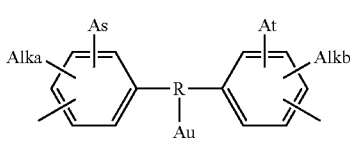

(3)

(In the formula, R represents a hydrocarbon group, a silicon-containing group, a nitrogen-containing group, a phosphorus-containing group, an oxygen-containing group, a sulfur-containing group, an aromatic group, which may be substituted with a substituent group having the anion exchange group, or direct bond; each Alk is the same or different and represents an alkyl group; each A is the same or different and represents a substituent group having an anion exchange group; a and b are the same or different and represent an integer of 0 to 4; and s, t, and u are the same or different and represent an integer of 0 to 4, and at least one of s, t, and u represents 1 or more.)

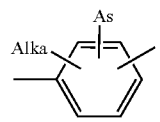

(3')

(In the formula, Alk represents an alkyl group; A represents a substituent group having an anion exchange group; a represents an integer of 0 to 4; and s represents an integer of 1 to 4.)

In the anion exchange resin of the present invention, the divalent fluorine-containing groups as shown in the formula (1) is preferably a divalent fluorinated saturated hydrocarbon group.

In order to solve the problem, the electrolyte membrane for a fuel cell of the present invention comprises the anion exchange resin as described above.

In order to solve the problem, the binder for forming the electrode catalyst layer of the present invention comprises the anion exchange resin as described above.

In order to solve the problem, the battery electrode catalyst layer of the present invention comprises the binder for forming an electrode catalyst layer as described above.

In order to solve the problem, the fuel cell of the present invention comprises:

an electrolyte membrane comprising the anion exchange resin as described above;

a fuel side electrode to which a hydrogen-containing fuel is supplied and an oxygen side electrode to which oxygen and air are supplied, the fuel side electrode and the oxygen side electrode being oppositely disposed by interposing the electrolyte membrane.

In the fuel cell of the present invention, the hydrogen-containing fuel is preferably hydrogen, an alcohol, or hydrazine.

In order to solve the problem, the fuel cell of the present invention comprises:

an electrolyte membrane;

a fuel side electrode to which a hydrogen-containing fuel is supplied and an oxygen side electrode to which oxygen and air are supplied, the fuel side electrode and the oxygen side electrode being oppositely disposed by interposing the electrolyte membrane;

wherein the fuel side electrode and/or the oxygen side electrode comprises the battery electrode catalyst layer as described above.

In the fuel cell of the present invention, the hydrogen-containing fuel is preferably hydrogen, an alcohol, or hydrazine.

Effect of the Invention

The present invention can provide an anion exchange resin being capable of producing an electrolyte membrane for a fuel cell, a binder for forming an electrode catalyst layer and a battery electrode catalyst layer, which have improved chemical properties and mechanical properties, an electrolyte membrane for a fuel cell and a binder for forming an electrode catalyst layer which are produced from the anion exchange resin, a battery electrode catalyst layer which is produced from the anion exchange resin, and a fuel cell which has the electrolyte membrane or the electrode catalyst layer.

MODE FOR CARRYING OUT THE INVENTION

Figure 1:
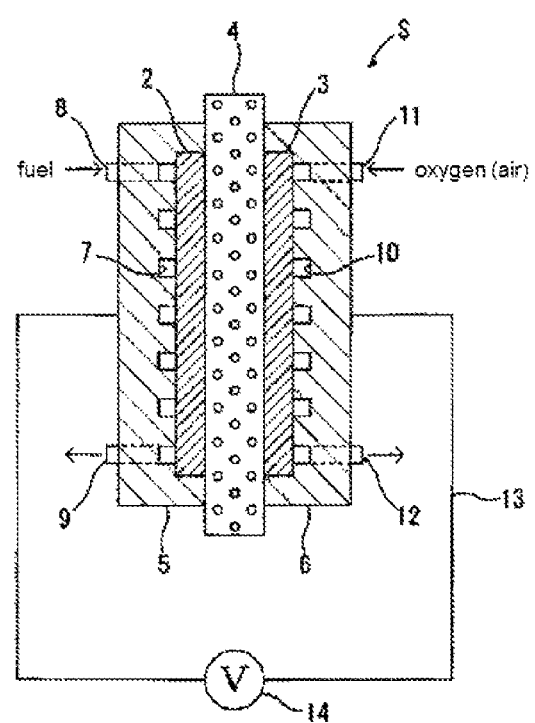
FIG. 1 is a schematic diagram showing an embodiment of the fuel cell.

The anion exchange resin of the present invention is composed of divalent hydrophobic groups, divalent hydrophilic groups, and a divalent fluorine-containing group.

In the anion exchange resin of the present invention, each of the divalent hydrophobic groups is composed of one aromatic ring, or is composed of a plurality of (two or more, and preferably two) aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond.

Examples of the aromatic ring include, for example, mono- or poly-aromatic hydrocarbons having carbon atoms of 6 to 14 such as benzene ring, naphthalene ring, indene ring, azulene ring, fluorene ring, anthracene ring, and phenanthrene ring; and heteroaromatic compounds such as azole, oxol, thiophene, oxazole, thiazole, and pyridine.

Preferred examples of the aromatic ring include mono-aromatic hydrocarbons having carbon atoms of 6 to 14, and more preferred examples include benzene ring.

The aromatic ring may be substituted with a substituent group such as a halogen atom, an alkyl group, or a pseudohalide, as needed. Examples of the pseudohalide include a trifluoromethyl group, —CN, —NC, —OCN, —NCO, —ONC, —SCN, —NCS, —SeCN, —NCSe, —TeCN, —NCTe, and —$N_3$.

When the aromatic ring is substituted with a substituent group such as a halogen atom, an alkyl group, or a pseudohalide, the number and the position of the substituent group such as a halogen atom, an alkyl group, or a pseudohalide is suitably selected depending on the purpose and application.

More specific examples of the aromatic ring substituted with a halogen atom include, for example, benzene rings substituted with one to four halogen atoms (for example, benzenes ring substituted with one to four fluorine atoms, benzene rings substituted with one to four chlorine atoms, benzene rings substituted with one to four bromine atoms, and benzene rings substituted with one to four iodine atoms, in which one to four halogen atoms may be all the same or different).

Examples of the divalent hydrophilic group include, for example, divalent saturated hydrocarbon groups having carbon atoms of 1 to 20 such as methylene (—$CH_2$—), ethylene, propylene, isopropylene (—$C(CH_3)_2$—), butylene, isobutylene, sec-butylene, pentylene (pentene), isopentylene, sec-pentylene, hexylene (hexamethylene), 3-methylpentene, heptylene, octylene, 2-ethylhexylene, nonylene, decylene, isodecylene, dodecylene, tetradecylene, hexadecylene, and octadecylene.

Preferred examples of the divalent hydrocarbon group include divalent saturated hydrocarbon groups having carbon atoms of 1 to 3, and specific examples include methylene (—$CH_2$—), ethylene, propylene, and isopropylene (—$C(CH_3)_2$—). More preferred examples include methylene (—$CH_2$—) and isopropylene (—$C(CH_3)_2$—), and particularly preferred examples include isopropylene (—$C(CH_3)_2$—).

The divalent hydrocarbon group may be substituted with a monovalent residue for the aromatic ring as described above.

Examples of the aromatic group include, for example, divalent residues for the aromatic ring as described above, and preferred examples include m-phenylene group and fluorenyl group.

Preferred examples of the hydrophobic group include biphenylene groups which may be substituted with a halogen atom or a pseudohalide, as shown in the following formula (2'); o-, m-, or p-phenylene groups which may be substituted with a halogen atom or a pseudohalide, as shown in the following formula (2"); and o-, m-, or p-phenylene groups which may be substituted with an alkyl group, as shown in the following formula (2"').

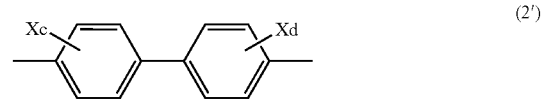

(In the formula, each X is the same or different and represents a halogen atom or a pseudohalide; and c and d are the same or different and represent an integer of 0 to 4.)

(In the formula, X represents a halogen atom or a pseudohalide; and c' represents an integer of 0 to 4.)

(In the formula, Alk represents an alkyl group; and c"' represents an integer of 0 to 4.)

In the above formula (2'), each X is the same or different and represents the halogen atom or the pseudohalide as described above.

In the above formula (2'), c and d are the same or different and represent an integer of 0 to 4. From the viewpoint of the chemical stability, at least one of c and d preferably represents an integer of 1 to 4. Particularly preferably, both c and d represent 4.

In the above formula (2"), X represents the halogen atom or the pseudohalide as described above; and c' represents an integer of 0 to 4 and preferably represents 4. Example of the pseudohalide includes the pseudohalides as described above.

In the above formula (2"'), Alk represents the alkyl group as described above; and c"' represents an integer of 0 to 4 and preferably represents 1.

Particularly preferred examples of the hydrophobic group include biphenylene group, biphenylene group as shown in the following formula (4) (biphenylene group in which each benzene ring is substituted with four fluorine atoms); p-phenylene group, perfluoro p-phenylene group as shown in the following formula (4') (p-phenylene group in which the benzene ring is substituted with four fluorine atoms); and 2-cyano-1,3-phenylene group as shown in the following formula (4″) (m-phenylene group in which the benzene ring is substituted with one cyano group).

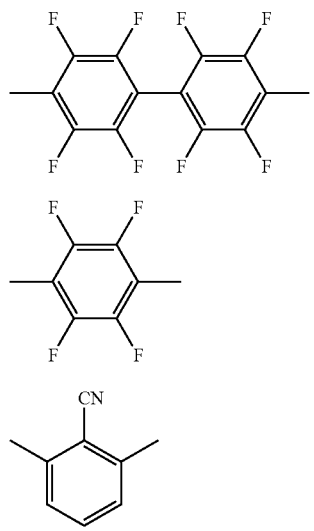

Preferred examples of the hydrophobic group also include bisphenol residues which may be substituted with an alkyl group, a halogen atom or a pseudohalide (divalent hydrophobic groups composed of two benzene rings which are bonded to each other via R), as shown in the following formula (2).

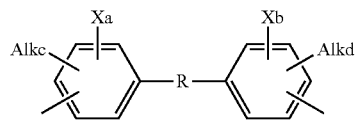

(In the formula, R represents a hydrocarbon group, a silicon-containing group, a nitrogen-containing group, a phosphorus-containing group, an oxygen-containing group, a sulfur-containing group, an aromatic group, or direct bond; each Alk is the same or different and represents an alkyl group; each X is the same or different and represents a halogen atom or a pseudohalide; and a, b, c, and d are the same or different and represent an integer of 0 to 4.)

In the above formula (2), R represents a hydrocarbon group, a silicon-containing group, a nitrogen-containing group, a phosphorus-containing group, an oxygen-containing group, a sulfur-containing group, or direct bond, and R preferably represents isopropylene ($-C(CH_3)_2-$).

In the above formula (2), each Alk represents the same or different and represents an alkyl group. Examples of the alkyl group include alkyl groups having carbon atoms of 1 to 20 such as methyl group, ethyl group, propyl group, i-propyl group, butyl group, i-butyl group, sec-butyl group, t-butyl group, pentyl group, hexyl group, heptyl group, and octyl group; and cycloalkyl groups having carbon atoms of 1 to 20 such as cyclopropyl group, cyclobutyl group, cyclopentyl group, cyclohexyl group, cycloheptyl group, and cyclooctyl group.

In the above formula (2), each X represents the same or different and represents the halogen atom or the pseudohalide as described above.

In the above formula (2), a and b represent the same or different and represent an integer of 0 to 4, and preferably represent an integer of 0 to 2. More preferably, both a and b represent 0.

In the above formula (2), c and d represent the same or different and represent an integer of 0 to 4, and preferably represent an integer of 0 to 2. More preferably, both c and d represent 0.

Particularly preferred examples of the hydrophobic group include bisphenol residue as shown in the following formula (5) (bisphenol A residue).

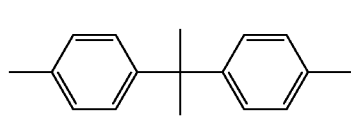

Other examples of the hydrophobic group include groups having the following structures.

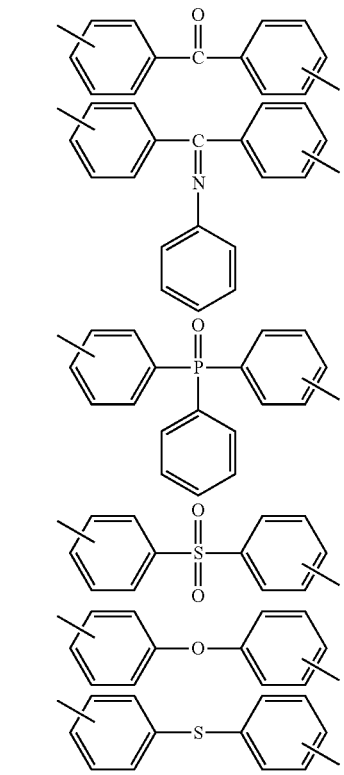

In the anion exchange resin of the present invention, each of the divalent hydrophilic groups is composed of one aromatic ring, or is composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, in which the aromatic ring or at least one of the aromatic rings has an anion exchange group.

Examples of the aromatic ring include, for example, the aromatic rings as described above, and preferred examples include benzene ring.

Examples of the divalent hydrocarbon group include the divalent hydrocarbon groups as described above.

The number of the aromatic ring bonded to the divalent hydrocarbon group is 1 or 2, and is preferably 2.

When one aromatic ring is further bonded to the divalent hydrocarbon group, the valence of the hydrocarbon group becomes three. When two aromatic rings are further bonded to the divalent hydrocarbon group, the valence of the hydrocarbon group becomes four (when the number of carbon is 1, the hydrocarbon group is carbon atom).

When two aromatic rings are bonded to the divalent hydrocarbon group, the aromatic rings may be bonded via carbon-carbon bond, for example.

The anion exchange group is introduced in the main chain or the side chain of the hydrophilic group. The anion exchange group is not particularly limited, but specific example which can be used include known anion exchange groups such as quaternary ammonium salts, tertiary amine groups, secondary amino groups, primary amino groups, phosphines, phosphazenes, tertiary sulfonium groups, quaternary boronium groups, quaternary phosphonium groups, and guanidium groups. From the viewpoint of the anion conductivity, preferred examples of the anion exchange group include quaternary ammonium salts.

Preferred examples of the anion exchange group include —$CH_2N^+(CH_3)_3OH^-$. Other examples include groups having the following structures. In the following structural formulae, * represents a moiety which is bonded to the aromatic ring having a substituent group, and the anion ($OH^-$) is omitted.

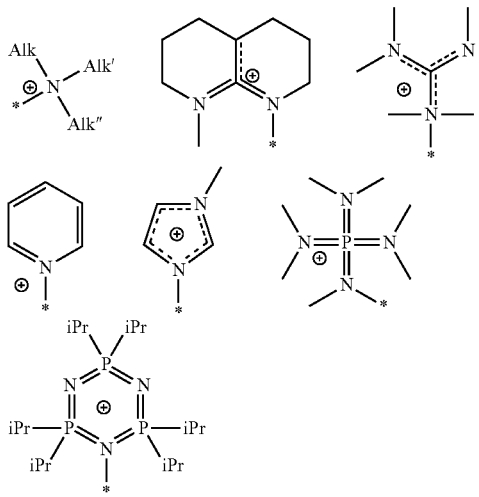

(In the figures, Alk, Alk', and Alk" represent the alkyl group as described above, iPr represents isopropyl group.)

Examples of the aromatic ring having the anion exchange group include the aromatic rings as described above, and preferred examples include benzene ring.

When the hydrophilic group has a plurality of aromatic rings, at least one of the aromatic rings is substituted with a substituent group having an anion exchange group. Two or more aromatic rings may be substituted with a substituent group having an anion exchange group, or all aromatic rings may be substituted with a substituent group having an anion exchange group. When two aromatic rings are bonded to the divalent hydrocarbon group, at least one of the aromatic rings is substituted with a substituent group having an anion exchange group. For example, one of the aromatic rings in the side chain may be substituted with a substituent group having an anion exchange group, or both aromatic rings in the side chain may be substituted with a substituent group having an anion exchange group. One aromatic ring may be substituted with a plurality of substituent groups having an anion exchange group.

Preferred examples of the hydrophilic group include bisphenol residues substituted with a substituent group having the anion exchange group, as shown in the following formula (3), and o-, m- or p-phenylene groups substituted with a substituent group having the anion exchange group, as shown in the following formula (3').

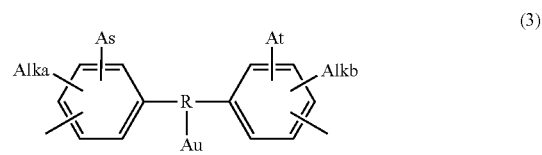

(In the formula, R represents a hydrocarbon group, a silicon-containing group, a nitrogen-containing group, a phosphorus-containing group, an oxygen-containing group, a sulfur-containing group, an aromatic group, which may be substituted with a substituent group having the anion exchange group, or direct bond; each Alk is the same or different and represents an alkyl group; each A is the same or different and represents a substituent group having an anion exchange group; a and b are the same or different and represent an integer of 0 to 4; and s, t, and u are the same or different and represent an integer of 0 to 4, and at least one of s, t, and u represents 1 or more.)

(In the formula, Alk represents an alkyl group; A represents a substituent group having an anion exchange group; a represents an integer of 0 to 4; and s represents an integer of 1 to 4.)

In the above formula (3), each A is the same or different and represents a substituent group having the anion exchange group as described above, and preferably represents the quaternary ammonium group as described above.

In the above formula (3), s, t, and u are the same or different and represent an integer of 0 to 4, and at least one of s, t, and u represents 1 or more.

In the above formula (3), when s, t, and/or u is a range of 1 to 3, the position of the substituent group having an anion exchange group is suitably selected depending on the purpose and application.

In the above formula (3'), A represents a substituent group having the anion exchange group as described above, and preferably represents the quaternary ammonium group as described above.

In the above formula (3'), s represents an integer of 1 to 4. The position of the substituent group having an anion exchange group is suitably selected depending on the purpose and application.

Other examples of the hydrophilic group include groups having the following structures.

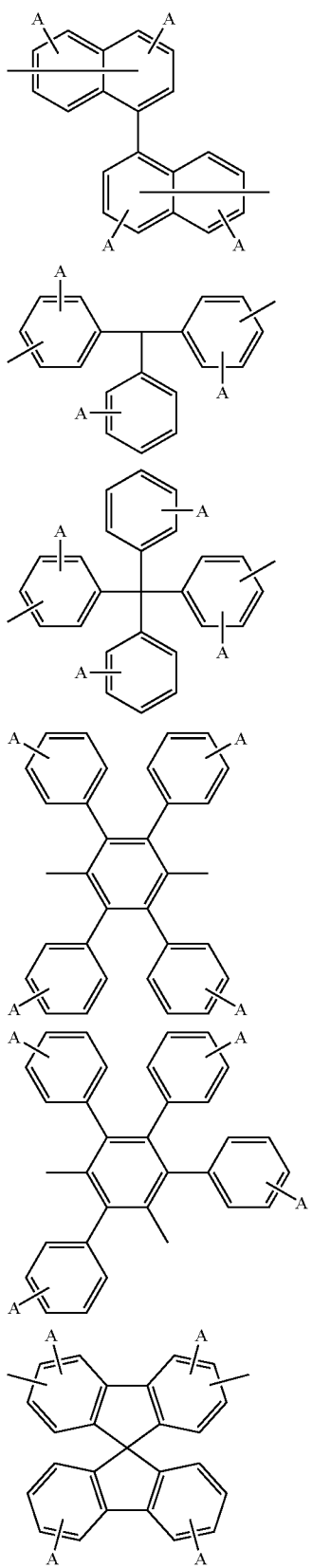

(In the formulae, each A represents a substituent group having an anion exchange group or a hydrogen atom, and at least one of A is a substituent group having an anion exchange group. A plurality of A may be bonded to one benzene ring structure.)

Particularly preferred examples of the hydrophilic group include bisphenol fluorene residues as shown in the following formula (6), p-phenylene group as shown in the following formula (6'), and m-phenylene group as shown in the following formula (6").

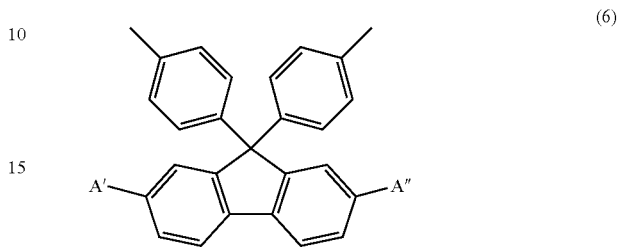

(6)

(In the formula, at least one of A' and A" represents —CH$_2$N$^+$(CH$_3$)$_3$OH$^-$, the other represents —CH$_2$N$^+$(CH$_3$)$_3$OH$^-$ or a hydrogen atom.)

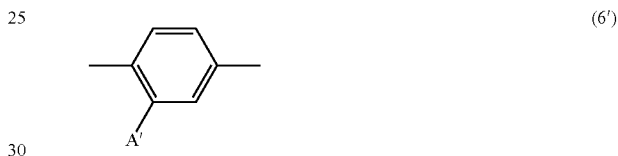

(6')

(In the formula, A' represents —CH$_2$N$^+$(CH$_3$)$_3$OH$^-$.)

(6")

(In the formula, A' represents —CH$_2$N$^+$(CH$_3$)$_3$OH$^-$.)

In the anion exchange resin of the present invention, the divalent fluorine-containing group is shown in the following formula (1).

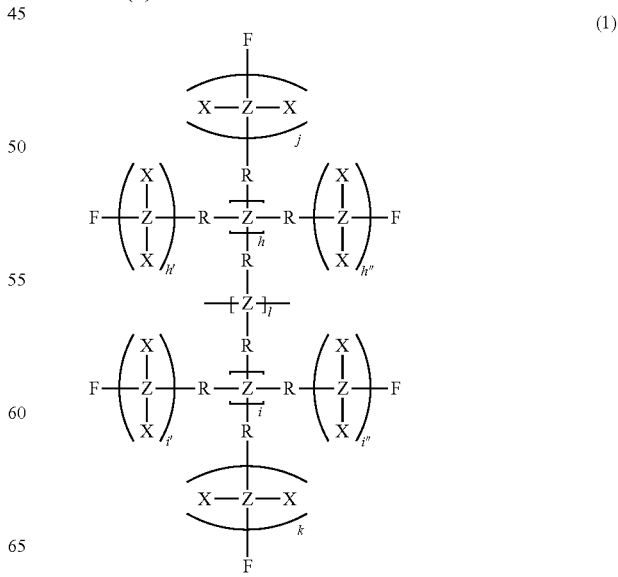

(1)

(In the formula, each Z is the same or different and represents carbon atom or silicon atom; each R is the same or different and represents a silicon-containing group, a nitrogen-containing group, a phosphorus-containing group, an oxygen-containing group, a sulfur-containing group, or direct bond; each X is the same or different and represents a halogen atom, a pseudohalide, or a hydrogen atom; l represents an integer of 1 or more; and h, h', h", i", j, and k are the same or different and represent an integer of 0 or more.)

In the above formula (1), each Z is the same or different and represents carbon atom or silicon atom, and preferably represents carbon atom.

In the above formula (1), each R is the same or different and represents a silicon-containing group, a nitrogen-containing group, a phosphorus-containing group, an oxygen-containing group, a sulfur-containing group, or direct bond, and preferably represents direct bond.

In the above formula (1), each X is the same or different and represents the halogen atom or the pseudohalide as described above, or hydrogen atom, preferably represents a halogen atom or a hydrogen atom, and more preferably represents a fluorine atom.

In the above formula (1), a represents an integer of 1 or more, preferably represents an integer of 1 to 20, and more preferably represents an integer of 4 to 8.

In the above formula (1), h, h', h", i", j, and k are the same or different and represent an integer of 0 or more, preferably represent an integer of 0 to 10, more preferably represent an integer of 0 to 3, and further more preferably represent an integer of 0 or 1.

Preferred examples of the divalent fluorine-containing group include groups having the following structures.

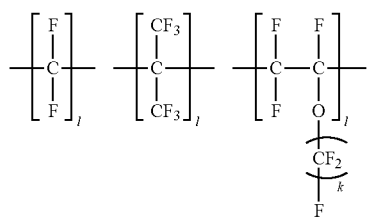

In the above formula, l represents an integer of 1 or more, preferably represents an integer of 1 to 10, and more preferably represents an integer of 2 to 6.

In the above formula, k represents an integer of 1 or more, preferably represents an integer of 1 to 10, more preferably represents an integer of 1 to 3, and further more preferably represents 1.

In the anion exchange resin of the present invention, the divalent fluorine-containing group may be bonded to the divalent hydrocarbon group via carbon-carbon bond or a carbon-silicon bond, as shown in the following formula (1').

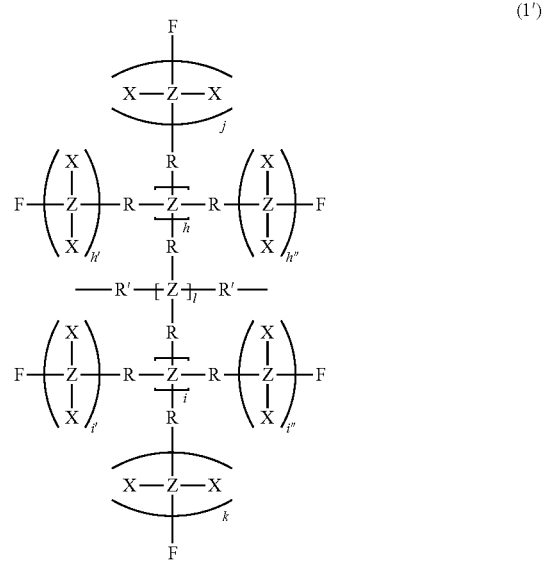

(In the formula, Z, R, X, h, h', h", i", j, k and l have the same meaning as Z, R, X, h, h', h", i", j, k and l in the above formula (1); and each R' is the same or different and represents a divalent hydrocarbon group or direct bond.)

The anion exchange resin of the present invention has a hydrophobic unit formed by repeating the divalent hydrophobic groups as described above via ether bond, thioether bond, or carbon-carbon bond and a hydrophilic unit formed by repeating the hydrophilic groups as described above via ether bond, thioether bond, or carbon-carbon bond. The preferred hydrophobic unit is formed by repeating the hydrophobic groups via carbon-carbon bond. The preferred hydrophilic unit is formed by repeating the hydrophilic groups via carbon-carbon bond.

It is noted that the unit corresponds to "block" commonly used in the block copolymer.

Preferred examples of the hydrophobic unit include units formed by bonding a biphenylene residue which may be substituted with a halogen atom or a pseudohalide as shown in the above formula (2') (a hydrophobic group), a phenylene group which may be substituted with a halogen atom or a pseudohalide as shown in the above formula (2") (a hydrophobic group), and/or a bisphenol residue which may be substituted with a halogen atom or a pseudohalide as shown in the above formula (2) (a hydrophobic group) to each other via ether bond and/or carbon-carbon direct bond. The examples also include units formed by bonding two or more types of hydrophobic groups from the biphenylene groups, the phenylene groups, and/or the bisphenol residues in random form, regular (e.g., alternative) form, or block form.

For example, such hydrophobic unit is shown in the following formula (7).

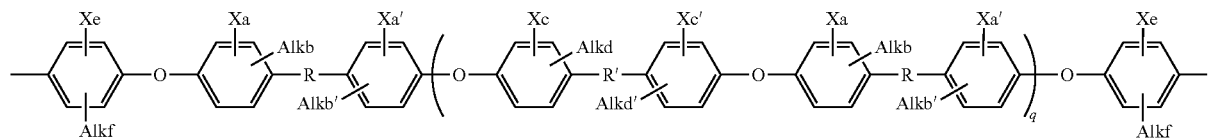

(7)

(In the formula, R and R' are the same or different and have the same meaning as R in the above formula (2); Alk has the same meaning as Alk in the above formula (2); X has the same meaning as X in the above formula (2); a, a', b. b', c, c', d, d', e, and f are the same or different and represent an integer of 0 to 4; and q represents 0 to 200.)

In the above formula (7), q represents, for example, 0 to 200, and preferably represents 4 to 50.

Particularly preferred examples of the hydrophobic unit include units formed by bonding a biphenylene group as shown in the above formula (4) (a biphenylene group in which each benzene ring is substituted with four halogen atoms) and a bisphenol A residue as shown in the above formula (5) (bisphenol A residue) to each other via ether bond; and by further bonding the unit and a phenylene group to each other via ether bond.

For example, such hydrophobic unit is shown in the following formula (8) or the following formula (8').

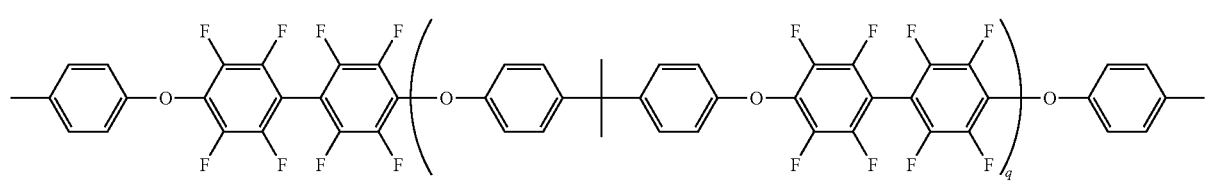

(8)

(In the formula, q represents 0 to 200.)

(8')

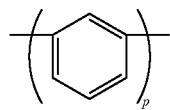

(In the formula, p represents 0 to 200.)

Preferred examples of the hydrophilic unit include unit formed by bonding a bisphenol A residue substituted with a substituent group having an anion exchange group as shown in the above formula (3) (a hydrophilic group) and/or an o-, m- or p-phenylene group substituted with a substituent group having an anion exchange group as shown in the above formula (3') (a hydrophilic group) to each other via carbon-carbon bond. The examples also include units formed by bonding two or more types of hydrophilic groups to each other via carbon-carbon bond.

For example, such hydrophilic unit is shown in the following formula (9) or the following formula (9').

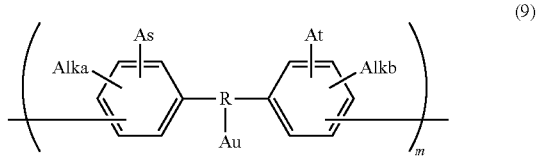

(9)

(In the formula, R represents a hydrocarbon group, a silicon-containing group, a nitrogen-containing group, a phosphorus-containing group, an oxygen-containing group, a sulfur-containing group, an aromatic group, each of which may be substituted with a substituent group having an anion exchange group, or direct bond; each Alk is the same or different and represents an alkyl group; each A is the same or different and represents a substituent group having an anion exchange group; a and b are the same or different and represent an integer of 0 to 4; s, t, and u are the same or different and represent an integer of 0 to 4, and at least one of s, t, and u represents 1 or more; and m represents an integer of 1 to 200.)

(9')

(In the formula, Alk has the same meaning as Alk in the above formula (3'); A has the same meaning as A in the above formula (3'); a and s have the same meaning as a and s in the above formula (3'); and m represents an integer of 1 to 200.)

Particularly preferred examples of the hydrophilic unit include units formed by bonding bisphenol fluorene residues shown in the above formula (6) to each other via carbon-carbon bond; unit formed by bonding p-phenylenes shown in the above formula (6') to each other via carbon-carbon bond; units formed by bonding m-phenylenes shown in the above formula (6") to each other via carbon-carbon bond; and units formed by bonding a p-phenylene shown in the above formula (6') and an m-phenylene shown in the above formula (6") to each other via carbon-carbon bond.

For example, such hydrophilic unit is shown in the following formula (10), the following formula (10'), the following formula (10"), or the following formula (10''').

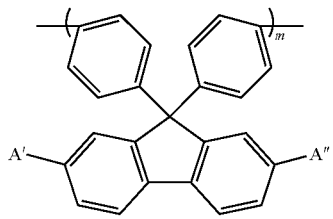
(10)

(In the formula, A' and A" have the same meaning as A' and A" in the above formula (6); and m has the same meaning as m in the above formula (9).)

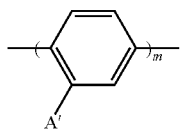
(10')

(In the formula, A' has the same meaning as A' in the above formula (6'); and m has the same meaning as m in the above formula (9').)

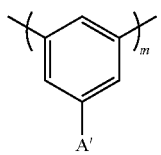
(10")

(In the formula, A' has the same meaning as A' in the above formula (6"); and m has the same meaning as m in the above formula (9').)

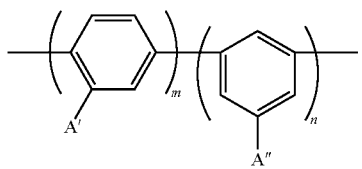
(10''')

(In the formula, A' and A" has the same meaning as A' and A" in the above formula (6') or the above formula (6"); and m and n have the same meaning as m in the above formula (9').)

In the anion exchange resin of the present invention, the hydrophobic unit as described above and the hydrophilic unit as described above are bonded via ether bond, thioether bond, or carbon-carbon bond. In particular, the hydrophobic unit as described above and the hydrophilic unit as described above are preferably bonded via carbon-carbon bond.

In the anion exchange resin of the present invention, the divalent fluorine-containing groups as described above are bonded via ether bond, thioether bond, carbon-silicon bond, or carbon-carbon bond in the main chain or main chains of the hydrophobic unit and/or the hydrophilic unit. In particular, the divalent fluorine-containing groups as described above are preferably bonded via carbon-carbon bond in the main chain or main chains of the hydrophobic unit and/or the hydrophilic unit. More preferably, the divalent fluorine-containing groups as described above are bonded via carbon-carbon bond in the main chain of the hydrophobic unit. When the divalent fluorine-containing groups are introduced in the main chain of the hydrophobic unit, the resulting introduced unit is referred to as the hydrophobic unit as a whole. When the divalent fluorine-containing groups are introduced in the main chain of the hydrophilic unit, the resulting introduced unit is referred to as the hydrophilic unit as a whole.

The anion exchange resin of the present invention has the following effects by introducing a divalent fluorine-containing group in the main chain or main chains of the hydrophobic unit and/or the hydrophilic unit.

The solubility and flexibility are improved due to the low intermolecular interaction between the main chains.

Since the divalent fluorine-containing group gives has water repellency, the phase separation between the unit and the hydrophilic moiety (surrounding the anion exchange group) can be improved to form an ion conductive path.

A hydrophilic hydroxide ion or an oxidant becomes less accessible due to the water repellency (the alkali resistance and the chemical stability are improved).

The stiffness of the main chain can be controlled (the flexibility of the electrolyte membrane is improved).

The glass transition temperature is low, and the anion exchange resin can be adhered to the catalyst layer (the contact resistance is decreased).

The gas diffusibility can be controlled (the diffusibility of oxygen is increased by using the binder).

Preferred examples of the divalent fluorine-containing group include perfluoroalkyl groups as shown in the above formula (1).

For example, such divalent fluorine-containing group is shown in the following formula (11).

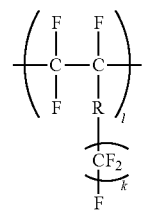
(11)

(In the formula, R, k and l have the same meaning as R, k and l in the above formula (1); k represents an integer of 0 or more; and l represents an integer of 1 or more.)

Particularly preferred examples of the divalent fluorine-containing group include linear perfluoroalkyl groups having carbon atoms of 2 to 12, as shown in the above formula (11').

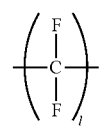
(11')

(In the formula, l has the same meaning as l in the above formula (1) and represents an integer of 1 or more.)

Preferred examples of the anion exchange resin include anion exchange resins formed by bonding a hydrophobic unit as shown in the above formula (7), a hydrophilic unit as shown in the above formula (9), and a fluorine-containing group as shown in the above formula (1) in the hydrophobic unit and/or the hydrophilic unit via carbon-carbon bond or a carbon-silicon bond, which is shown in the following formula (12); and anion exchange resins formed by bonding a hydrophobic unit as shown in the above formula (7'), a hydrophilic unit as shown in the above formula (9'), and a fluorine-containing group as shown in the above formula (1) in the hydrophobic unit and/or the hydrophilic unit via carbon-carbon bond or a carbon-silicon bond, which is shown in the following formula (12'). Alternatively, preferred examples of the anion exchange resin include anion exchange resins formed by bonding a hydrophobic unit without a fluorine-containing group as shown in the above formula (7), a hydrophilic unit without a fluorine-containing group as shown in the above formula (9'), and a fluorine-containing monomer via carbon-carbon bond or carbon-silicon bond, which is shown in the following formula (12").

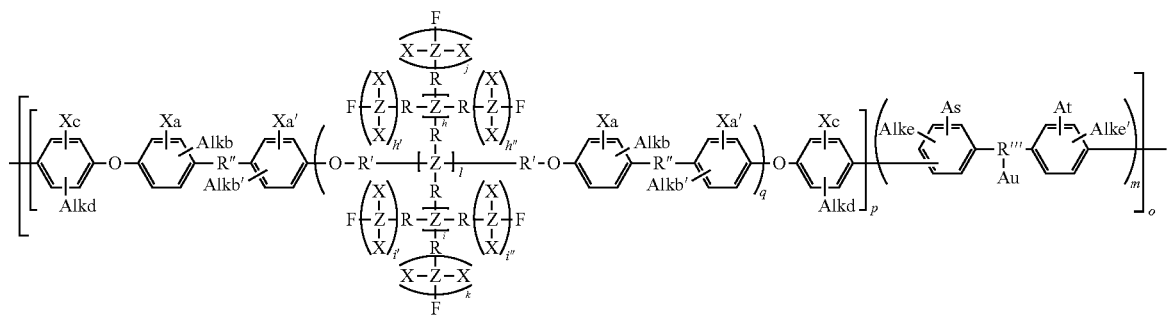

(12)

(In the formula, each R has the same meaning as R in the above formula (1); each R' has the same meaning as R' in the above formula (1'); each R" and R'" have the same meaning as R in the above formula (2); each Alk has the same meaning as Alk in the above formula (2); each X has the same meaning as X in the above formula (1); A has the same meaning as A in the above formula (3); Z has the same meaning as Z in the above formula (1); h, h', h", i", j, k and l have the same meaning as h, h', h", i", j, k and l in the above formula (1); a, a', b, b', c, d, e, e', s, t, and u are the same or different and represent an integer of 0 to 4; q has the same meaning as q in the above formula (7); p and m represent the blending ratio; and o represents an integer of 1 to 100.)

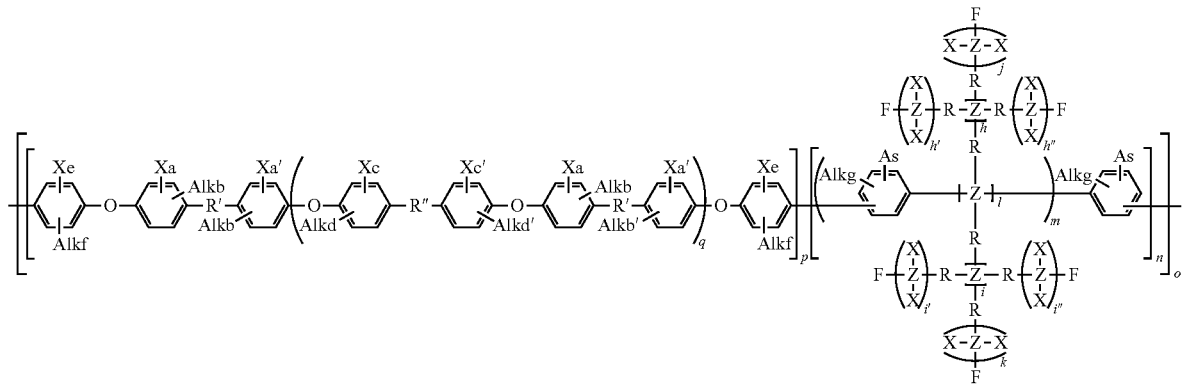

(12')

(In the formula, each R has the same meaning as R in the above formula (1); each R' and R" have the same meaning as R in the above formula (2); each Alk has the same meaning as Alk in the above formula (2); each X has the same meaning as X in the above formula (1); A has the same meaning as A in the above formula (3); Z has the same meaning as Z in the above formula (1); h, h', h", i", j, k and l have the same meaning as h, h', h", i", j, k and l in the above formula (1); a, a', b, b', c, c', d, d', e, f, g, and s are the same or different and represent an integer of 0 to 4; q has the same meaning as q in the above formula (7); m has the same meaning as m in the above formula (9); p and n represent the blending ratio; and o represents an integer of 1 to 100.)

hydrophobic unit as shown in the above formula (8'), hydrophilic units as shown in the above formula (10') and the above formula (10") via carbon-carbon bond, and by further bonding thereto a divalent fluorine-containing group as shown in the above formula (11), which is shown in the following formula (13); anion exchange resins formed by bonding a hydrophobic unit as shown in the above formula (8) and a hydrophilic unit as shown in the above formula (10) via carbon-carbon bond, and by further bonding thereto a divalent fluorine-containing group as shown in the above formula (11), which is shown in the following formula (13');

(12")

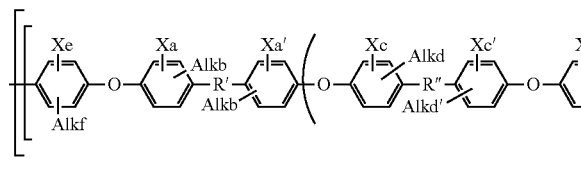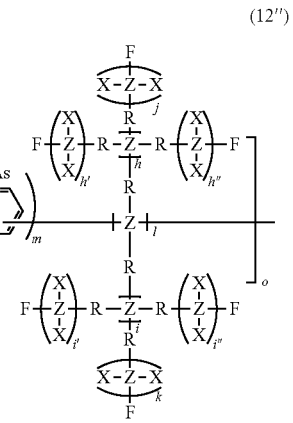

(In the formula, each R has the same meaning as R in the above formula (1); each R' and R" have the same meaning as R in the above formula (2); each Alk has the same meaning as Alk in the above formula (2); each X has the same meaning as X in the above formula (1); A has the same meaning as A in the above formula (3); Z has the same meaning as Z in the above formula (1); h, h', h", i", j, and k have the same meaning as h, h', h", i", j, and k in the above formula (1); a, a', b, b', c, c', d, d', e, f, g, and s are the same or different and represent an integer of 0 to 4; q has the same meaning as q in the above formula (7); p, m, and l represent the blending ratio; and o represents an integer of 1 to 100.)

anion exchange resins formed by bonding a hydrophobic unit as shown in the above formula (8) and a hydrophilic unit as shown in the above formula (10") via carbon-carbon bond, and by further bonding thereto a divalent fluorine-containing group as shown in the above formula (11), which is shown in the following formula (13"); and anion exchange resins formed by bonding a hydrophobic unit as shown in the above formula (8) and a hydrophilic unit as shown in the above formula (10''') via carbon-carbon bond, and by further bonding thereto a divalent fluorine-containing group as shown in the above formula (11), which is shown in the following formula (13''').

(13)

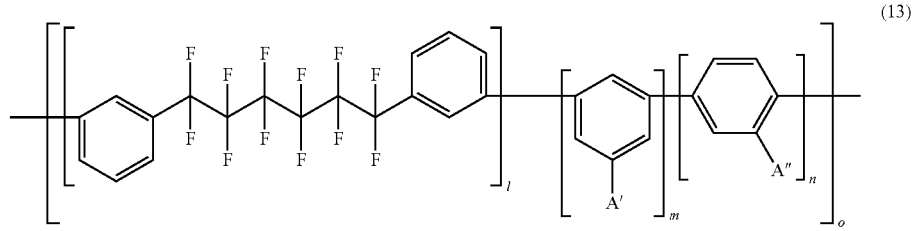

The number average molecular weight of the anion exchange resin is adjusted to be from 10 to 1000 kDa, and to be preferably from 30 to 500 kDa.

Particularly preferred examples of the anion exchange resin include anion exchange resins formed by bonding a (In the formula, A' and A" have the same meaning as A' and A" in the above formula (6); l, m, and n represent the blending ratio; and o has the same meaning as o in the above formula (12).)

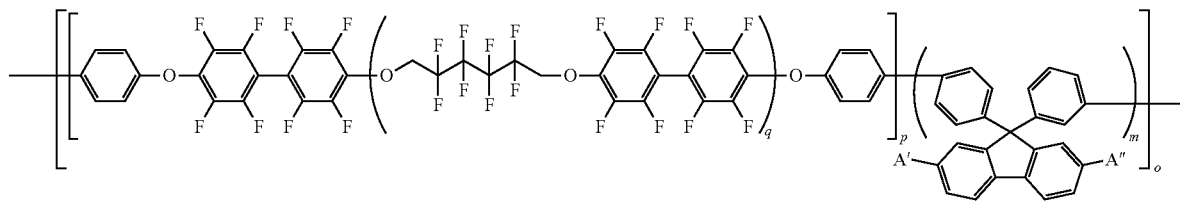

(13')

(In the formula, A' and A" have the same meaning as A' and A" in the above formula (6); q has the same meaning as q in the above formula (7); p and m represent the blending ratio; and o has the same meaning as o in the above formula (12).)

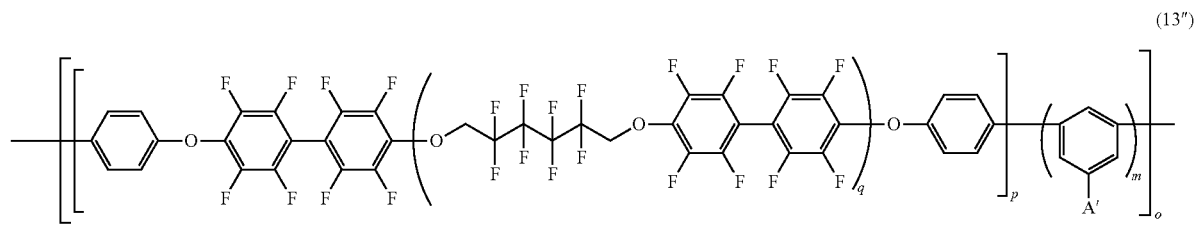

(13")

(In the formula, A' has the same meaning as A' in the above formula (6'); q has the same meaning as q in the above formula (7); p and m represent the blending ratio; and o has the same meaning as o in the above formula (12).)

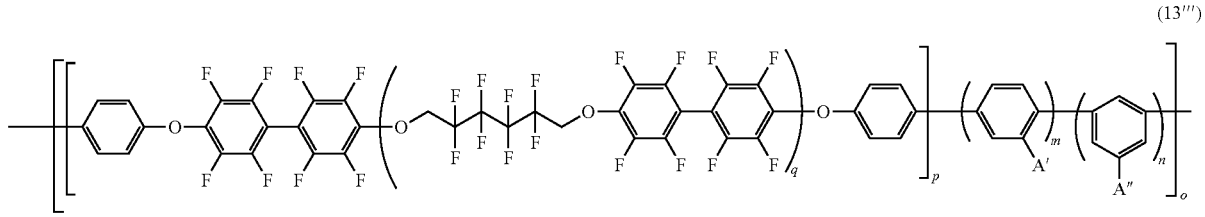

(13''')

(In the formula, A' and A" have the same meaning as A' and A" in the above formula (6') or the above formula (6"); q has the same meaning as q in the above formula (7); p, m, and n represent the blending ratio; and o has the same meaning as o in the above formula (12).)

As described above, the number average molecular weight of the anion exchange resin is, for example, from 10 to 1000 kDa, and is preferably from 30 to 500 kDa.

The method for producing the anion exchange resin is not particularly limited, and any method known in the art can be used. Preferably, the method by polycondensation reaction is used.

When the anion exchange resin is produced by the method, for example, a monomer or a first oligomer for forming at least a part of the hydrophobic unit is produced by polycondensation reaction. A second oligomer is optionally produced by bonding thereto a cross-coupling group by polycondensation reaction. A monomer for forming the hydrophilic unit is polymerized by cross-coupling reaction, and then a substituent group having an anion exchange group is introduced to the resulting precursor polymer for the anion exchange resin.

For polycondensation reaction, any conventional known method ("New Polymer Experiment 3, Synthesis Method and Reaction of Polymer (2), Synthesis of Condensation Polymer" p. 7-57, p. 399-401, (1996) KYORITSU SHUPPAN CO., LTD.), (J. Am. Chem. Soc., 129, 3879-3887 (2007)), (Eur. Polym. J., 44, 4054-4062 (2008)) can be used. Preferably, a method for reacting a dihalogenated compound and a diol compound to form ether bond, or a cross-coupling method for reacting dihalogenated compounds to form carbon-carbon direct bond can be used.

In order to produce a first oligomer, a diol compound and a dihalogenated compound are polycondensed for forming a hydrophobic group.

Examples of the diol compound for forming a hydrophobic group include compounds having a plurality of (preferably two) aromatic rings as described above bonded to each other via the divalent hydrocarbon group as described above and two hydroxyl groups bonded to the aromatic rings.

Preferred examples of the diol compound for forming a hydrophobic group include compounds as shown in the following formula (14), which correspond to the above formula (2).

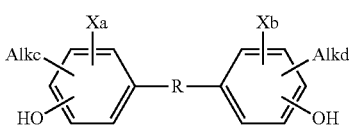

(14)

(In the formula, R has the same meaning as R in the above formula (2); each Alk has the same meaning as Alk in the above formula (2); each X has the same meaning as X in the above formula (2); and a, b, c, and d have the same meaning as a, b, c, and d in the above formula (2).)

Particularly preferred examples of the diol compound for forming a hydrophobic group include compound as shown in the following formula (14') (2,2-bis(4-hydroxyphenyl)propane), which corresponds to the above formula (4).

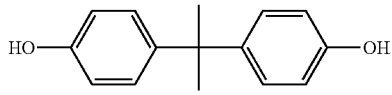

(14')

On the other hand, examples of the dihalogenated compound for forming a hydrophobic group include compounds having a plurality of (preferably two) aromatic rings as described above bonded to each other via the divalent hydrocarbon group as described above and two halogen atoms or pseudohalides bonded to the aromatic rings.

Preferred examples of the dihalogenated compound for forming a hydrophobic group include compounds as shown in the following formula (15), which correspond to the above formula (2).

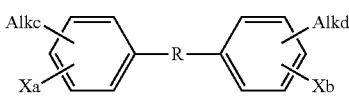

(15)

(In the formula, R has the same meaning as R in the above formula (2); each Alk has the same meaning as Alk in the above formula (2); each X has the same meaning as X in the above formula (2); a and b are the same or different and represents an integer of 1 to 5; and c and d are the same or different and represents an integer of 0 to 4.)

Particularly preferred examples of the dihalogenated compound for forming a hydrophobic group include compound as shown in the following formula (16) (decafluorobiphenyl), which corresponds to the above formula (5).

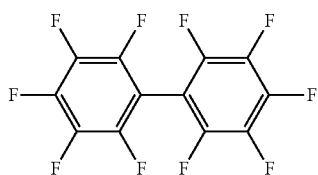

(16)

In the polycondensation reaction for forming a hydrophobic unit, the blending ratio of the diol compound and the dihalogenated compound for forming a hydrophobic group is adjusted so that the repeating number of the unit in the resulting first oligomer is q in the above formula (12), the above formula (12'), or formula (12").

The first oligomer is formed as a dihalogenated compound or a diol compound.

When the first oligomer is formed as a dihalogenated compound, the blending ratio of the diol compound and the dihalogenated compound is adjusted so that the amount of the dihalogenated compound becomes excessive. Specifically, for 1 mol of the diol compound, the amount of the dihalogenated compound is preferably $(q+1)/q$ mol in a relationship of q in the above formula (7).

On the other hand, when the first oligomer is formed as a diol compound, the blending ratio of the diol compound and the dihalogenated compound is adjusted so that the amount of the diol compound becomes excessive. Specifically, for 1 mol of the dihalogenated compound, the amount of the diol compound is preferably $(q+1)/q$ mol in a relationship of q in the above formula (7).

In the method, the diol compound and the dihalogenated compound are polycondensed for forming a hydrophobic group in an organic solvent.

Examples of the organic solvent include polar aprotic solvents.

Examples of the polar aprotic solvent include dimethyl sulfoxide, sulfolane, pyridine, N-methylpyrrolidone, N-cyclohexylpyrrolidone, N,N-dimethylformamide, and N,N-dimethylacetamide (DMAc).

The polar aprotic solvent may be used alone or in combination with two or more kinds.

Preferred examples of polar aprotic solvents include N,N-dimethylacetamide and dimethyl sulfoxide.

As the organic solvent, a different solvent may be further used together.

The different solvent is not particularly limited. Examples of the different solvent include any known nonpolar solvents (for example, aliphatic hydrocarbons, halogenated aliphatic hydrocarbons (for example, chloroform), alicyclic hydrocarbons (for example, cyclohexane), and aromatic hydrocarbons); and any known aprotic aromatic solvents (for example, toluene, xylene, chlorobenzene, or o-dichlorobenzene).

When a polar aprotic solvent is used in combination with a different solvent, the blending ratio is suitably selected depending on the purpose and application.

The blending ratio of the organic solvent for the diol compound and the dihalogenated compound for forming a hydrophobic group is suitably selected depending on the purpose and application.

In the polycondensation reaction, a basic compound can be blended.

Examples of the basic compound include carbonate salts such as, for example, lithium carbonate, sodium carbonate, sodium hydrogen carbonate, potassium carbonate, potassium hydrogen carbonate, cesium carbonate, magnesium carbonate, and calcium carbonate; metal hydroxides such as, for example, lithium hydroxide, sodium hydroxide, and potassium hydroxide; and phosphate salts such as, for example, sodium phosphate, sodium hydrogen phosphate, sodium dihydrogen phosphate, potassium phosphate, potassium hydrogen phosphate, and potassium dihydrogen phosphate.

The basic compound may be used alone or in combination with two or more kinds.

Preferred examples of the basic compound include metal carbonate salts. More preferred example of the basic compound includes potassium carbonate.

For example, when a carbonate salt catalyst is used, the blending amount of the basic compound is equal to or more than the mol number of hydroxyl groups presented in the reaction mixture, and is preferably 1.2 times or more.

The reaction temperature in the polycondensation reaction is, for example, from 50 to 300° C., and is preferably from 50 to 200° C. The reaction time is, for example, from 1 to 20 hours, and is preferably from 2 to 5 hours.

The first oligomer is preferably obtained as a dihalogenated compound by reacting the diol compound as shown in the above formula (14) and the dihalogenated compound as shown in the above formula (15), as described above.

Specifically, such dihalogenated compound is shown in the following formula (17).

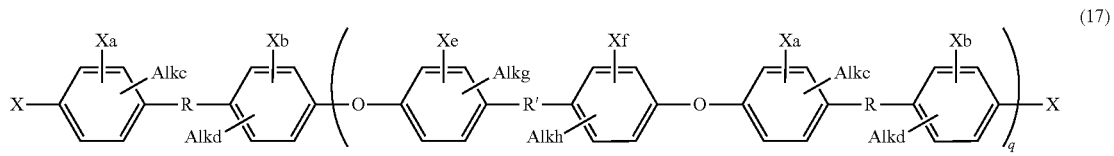

(17)

(In the formula, each R and R' has the same meaning as R in the above formula (2); each Alk has the same meaning as Alk in the above formula (2); each X has the same meaning as X in the above formula (2); a, b, c, d, e, f, g, and h are the same or different and represents an integer of 0 to 4; and q has the same meaning as q in the above formula (7).)

Particularly preferably, the first oligomer is obtained as a dihalogenated compound or a diol compound (preferably as a dihalogenated compound) by reacting the diol compound as shown in the above formula (14') and the dihalogenated compound as shown in the above formula (16).

Specifically, such dihalogenated compound is shown in the following formula (18).

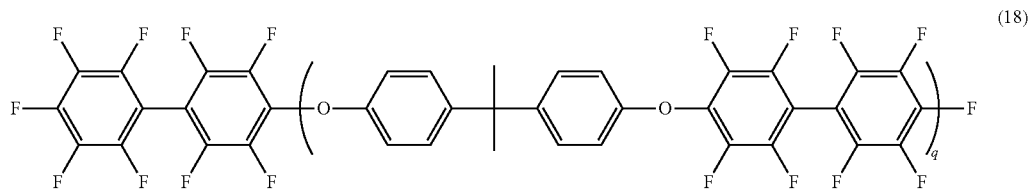

(18)

(In the formula, q has the same meaning as q in the above formula (7).)

When the first oligomer obtained as a dihalogenated compound contains a fluorine-containing group, the first oligomer is preferably obtained as a dihalogenated compound by reacting the diol compound having a fluorine-containing group as shown in the above formula (1) and the dihalogenated compound as shown in the above formula (15), as described above.

Specifically, such dihalogenated compound having a fluorine-containing group is shown in the following formula (17').

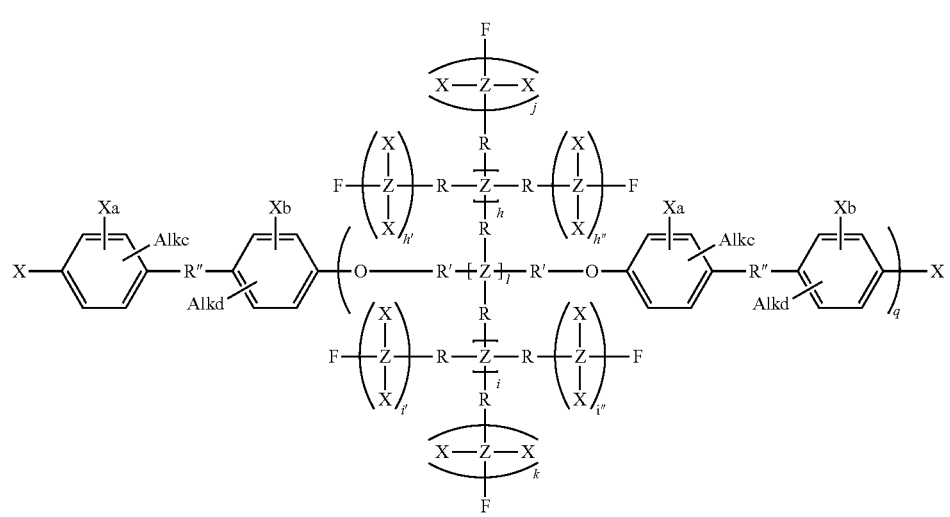

(17')

(In the formula, each R has the same meaning as R in the above formula (1); each R' has the same meaning as R' in the above formula (1'); each R" has the same meaning as R" in the above formula (2); each Alk has the same meaning as Alk in the above formula (2); each X has the same meaning as X in the above formula (1); each A has the same meaning as A in the above formula (3); each Z has the same meaning as Z in the above formula (1); h, h', h", i", j, k, and l have the same meaning as h, h', h", i", j, k, and l in the above formula (1); and a to d are the same or different and represents an integer of 0 to 4; and q has the same meaning as q in the above formula (7).)

Particularly preferably, the first oligomer is obtained as a dihalogenated compound or a diol compound (preferably as a dihalogenated compound) by reacting the diol compound having a fluorine-containing group as shown in the above formula (11) and the dihalogenated compound as shown in the above formula (16).

Specifically, such dihalogenated compound is shown in the following formula (18').

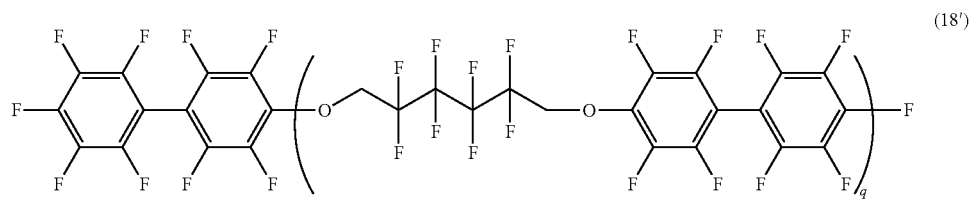

(In the formula, q has the same meaning as q in the above formula (7).)

For example, the first oligomer can also be obtained as a diol compound by reacting the dihalogenated compound as shown in the above formula (15) and the diol compound as shown in the above formula (14), as described above.

Specifically, such diol compound is shown in the following formula (17").

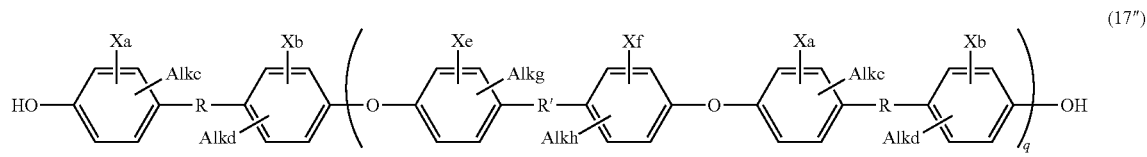

(In the formula, each R and R' has the same meaning as R in the above formula (2); each Alk has the same meaning as Alk in the above formula (2); each X has the same meaning as X in the above formula (2); a, b, c, d, e, f, g, and h are the same or different and represents an integer of 0 to 4; and q has the same meaning as q in the above formula (7).)

When the first oligomer obtained as a diol compound contains a fluorine-containing group, the first oligomer is preferably obtained as a diol compound by reacting the diol compound having a fluorine-containing group as shown in the above formula (1) and the dihalogenated compound as shown in the above formula (15), as described above.

Specifically, such dihalogenated compound having a fluorine-containing group is shown in the following formula (17'").

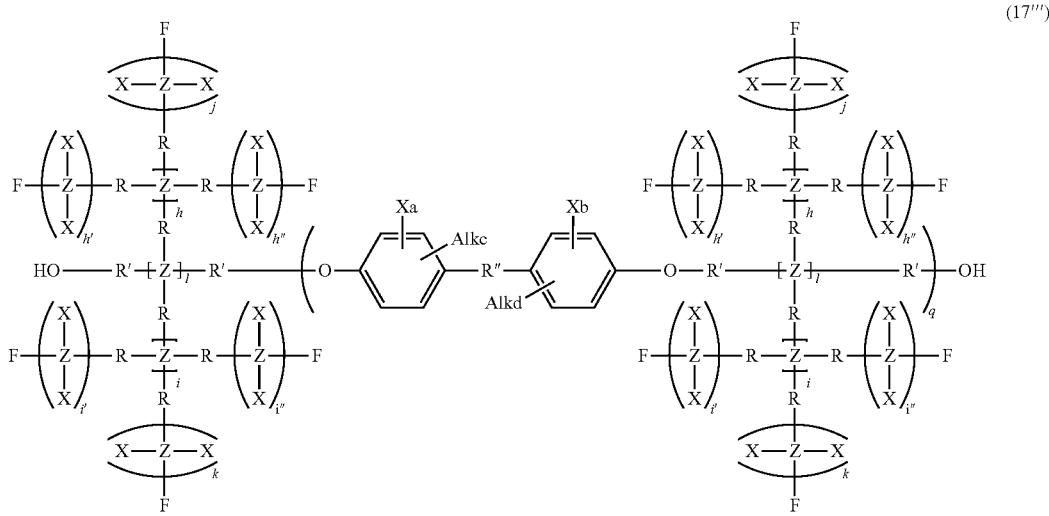

(17''')

(In the formula, each R has the same meaning as R in the above formula (1); each R' has the same meaning as R' in the above formula (1'); each R" has the same meaning as R" in the above formula (2); each Alk has the same meaning as Alk in the above formula (2); each X has the same meaning as X in the above formula (1); each Z has the same meaning as Z in the above formula (1); h, h', h", i", j, k, and l have the same meaning as h, h', h", i", j, k, and l in the above formula (1); and a to d are the same or different and represents an integer of 0 to 4; and q has the same meaning as q in the above formula (7).)

For example, when the fluorine-containing group is a dihalogenated compound in the above formula (17"), the dihalogenated compound as shown in the following formula (17''') can be obtained. Alternatively, when the fluorine-containing group is a dihalogenated compound in the above formula (17'), the diol compound as shown in the following formula (17'''') can be obtained.

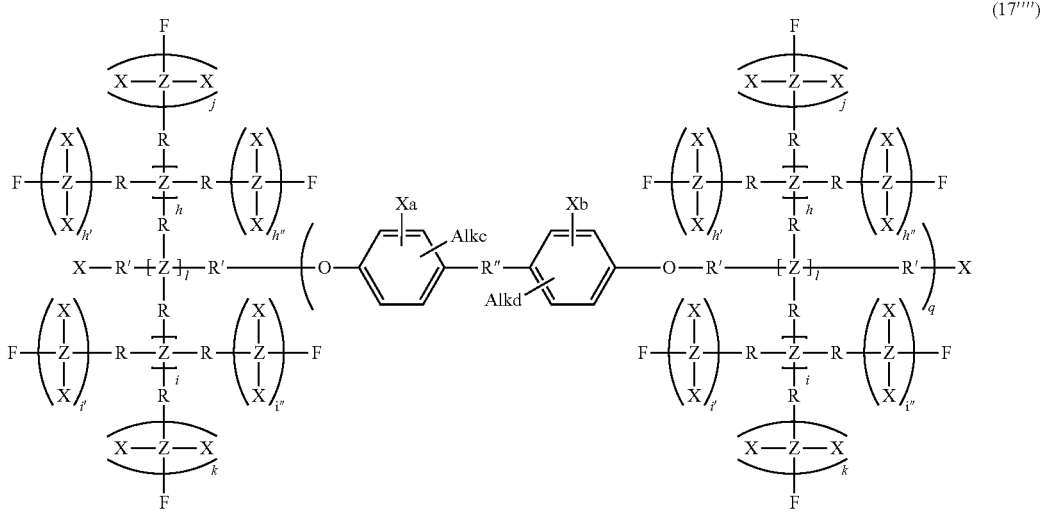

(17'''')

(In the formula, each R has the same meaning as R in the above formula (1); each R' has the same meaning as R' in the above formula (1'); each R" has the same meaning as R" in the above formula (2); each Alk has the same meaning as Alk in the above formula (2); each X has the same meaning as X in the above formula (1); each Z has the same meaning as Z in the above formula (1); h, h', h", i", j, k, and l have the same meaning as h, h', h", i", j, k, and l in the above formula (1); and a to d are the same or different and represents an integer of 0 to 4; and q has the same meaning as q in the above formula (7).)

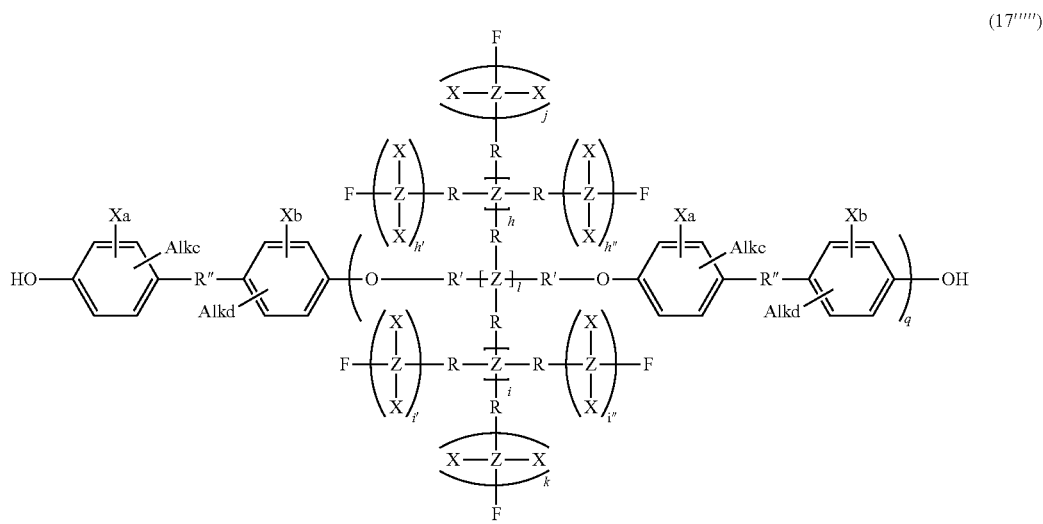

(17''''')

(In the formula, each R has the same meaning as R in the above formula (1); each R' has the same meaning as R' in the above formula (1'); each R" has the same meaning as R" in the above formula (2); each Alk has the same meaning as Alk in the above formula (2); each X has the same meaning as X in the above formula (1); each Z has the same meaning as Z in the above formula (1); h, h', h", i", j, k, and l have the same meaning as h, h', h", i", j, k, and l in the above formula (1); and a to d are the same or different and represents an integer of 0 to 4; and q has the same meaning as q in the above formula (7).)

When the hydrophobic unit formed is bonded to a hydrophilic group via carbon-carbon direct bond, the second oligomer can be produced by polycondensation reaction of a first oligomer which is a dihalogenated compound and a halogenated phenol compound as a cross-coupling group to the hydrophilic group for forming a hydrophobic group, for example.

Preferred examples of the halogenated phenol compound for forming a hydrophobic group include compounds as shown in the following formula (19) or (19').

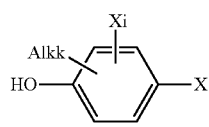

(19)

(In the formula, Alk has the same meaning as Alk in the above formula (2); each X has the same meaning as X in the above formula (2); and i and k represent an integer of 0 to 4.)

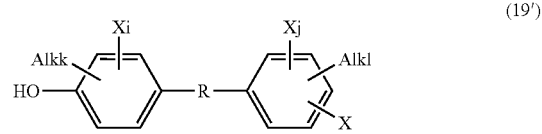

(19')

(In the formula, R has the same meaning as R in the above formula (2); each Alk has the same meaning as Alk in the above formula (2); each X has the same meaning as X in the above formula (2); and i, j, k, and l are the same or different and represents an integer of 0 to 4.)

Particularly preferred examples of the halogenated phenol compound for forming a hydrophobic group include compound as shown in the following formula (19").

(19")

The second oligomer is preferably obtained as a dihalogenated compound by reacting the dihalogenated compound as shown in the above formula (17) and the halogenated phenol compound as shown in the above formula (19).

Specifically, such dihalogenated compound is shown in the following formula (20).

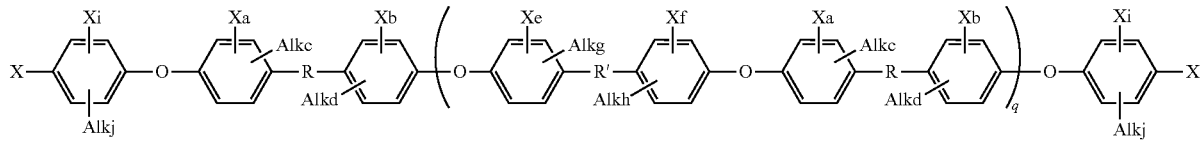

(20)

(In the formula, each R and R' has the same meaning as R in the above formula (2); each Alk has the same meaning as Alk in the above formula (2); each X has the same meaning as X in the above formula (2); a, b, c, d, e, f, g, h, i, and j are the same or different and represents an integer of 0 to 4; and q has the same meaning as q in the above formula (7).)

Particularly preferably, the second oligomer is obtained as a dihalogenated compound by reacting the dihalogenated compound as shown in the above formula (18) and the halogenated phenol compound as shown in the above formula (19″).

Specifically, such dihalogenated compound is shown in the following formula (20').

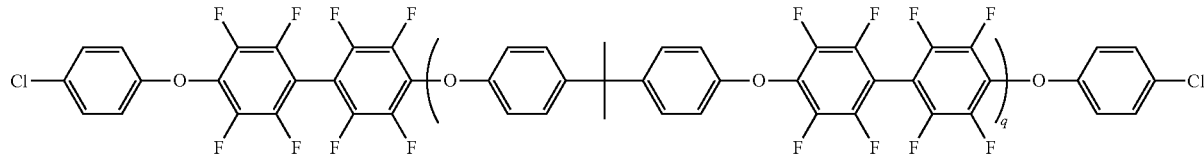

(20')

(In the formula, q has the same meaning as q in the above formula (7).)

When the second oligomer contains a fluorine-containing group, the second oligomer is preferably obtained as a dihalogenated compound having a fluorine-containing group by reacting the dihalogenated compound having a fluorine-containing group as shown in the above formula (17') and the halogenated phenol compound as shown in the above formula (19).

Specifically, such dihalogenated compound having a fluorine-containing group is shown in the following formula (20″).

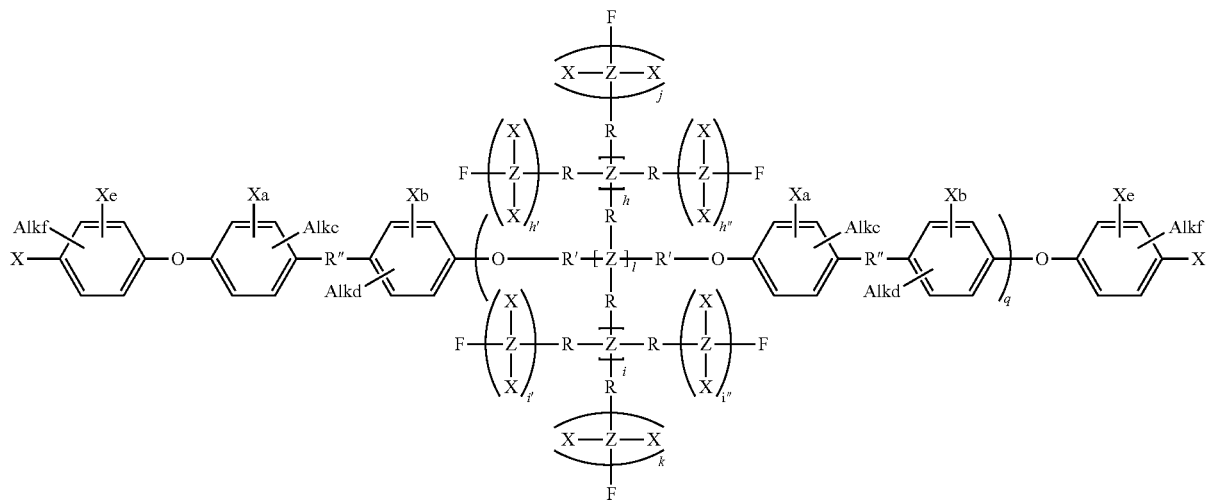

(20″)

(In the formula, each R has the same meaning as R in the above formula (1); each R' has the same meaning as R' in the above formula (1'); each R" has the same meaning as R" in the above formula (2); each Alk has the same meaning as Alk in the above formula (2); each X has the same meaning as X in the above formula (1); each Z has the same meaning as Z in the above formula (1); h, h', h", i", j, k, and l have the same meaning as h, h', h", i", j, k, and l in the above formula (1); and a to f are the same or different and represents an integer of 0 to 4; and q has the same meaning as q in the above formula (7).)

When the second oligomer and a hydrophilic group form carbon-carbon direct bond, the second oligomer can be produced by polycondensation reaction of a first oligomer which is a diol compound and a dihalogenated benzene compound as a cross-coupling group to the hydrophilic group for forming a hydrophobic group, for example.

Preferred examples of the dihalogenated benzene compound for forming a hydrophobic group include compounds as shown in the following formula (19a) or (19a').

(In the formula, Alk has the same meaning as Alk in the above formula (2); each X and X' is the same or different and represent a halogen atom or a pseudohalide; and i and k are the same or different and represent an integer of 0 to 4.)

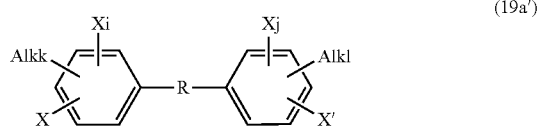

(In the formula, R has the same meaning as R in the above formula (2); each Alk has the same meaning as Alk in the above formula (2); each X and X' are the same or different and represent a halogen atom or a pseudohalide; and i, j, k, and l are the same or different and represent an integer of 0 to 4.)

Particularly preferred examples of the dihalogenated benzene compound for forming a hydrophobic group include compound as shown in the following formula (19a").

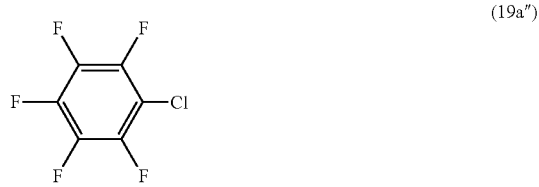 [SMILES: Fc1c(F)c(F)c(Cl)c(F)c1F]

For producing a first oligomer which forms carbon-carbon direct bond, dihalogenated compounds for forming a hydrophobic group are reacted by cross-coupling reaction.

Examples of the dihalogenated compound for forming a hydrophobic group include compounds having a plurality of (preferably two) aromatic rings bonded to each other via a divalent hydrocarbon group and two halogeno groups bonded to the aromatic rings, as shown in the above formula (19a).

Examples of the dihalogenated compound for forming carbon-carbon direct bond and forming a hydrophilic unit include compounds composed of one aromatic ring, or composed of a plurality of aromatic rings which are bonded to each other via a divalent hydrocarbon group or carbon-carbon bond.

Preferred examples of the dihalogenated compound for forming a hydrophilic unit include compounds as shown in the following formula (21) (bishalogenophenylfluorene), which correspond to the above formula (3); and compounds as shown in the following formula (21') (dihalogenobenzene), which correspond to the above formula (3').

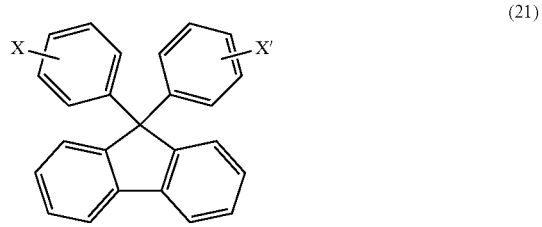

(In the formula, X and X' are the same or different and represent a halogen atom or a pseudohalide.)

(In the formula, X and X' are the same or different and represent a halogen atom or a pseudohalide.)

In the cross-coupling reaction, the blending ratio of the monomer for forming a hydrophilic unit is adjusted so that the repeating number of the hydrophilic group in the hydrophilic unit in the resulting precursor polymer for the anion exchange resin is m in the above formula (10) or formula (10').

In order to produce a monomer for forming ether bond, or to produce the hydrophilic unit, a diol compound and a dihalogenated compound for forming a hydrophilic group and/or a diol compound and a dihalogenated compound having a fluorine-containing group as shown in the above formula (3) are polycondensed by the above method.

As described above, in order to randomly introduce a divalent fluorine-containing group to a polymer, a hydrophobic unit and/or a hydrophilic unit having a fluorine-containing group is formed from a diol compound and a dihalogenated compound obtained by polycondensation reaction or cross-coupling reaction as described above of a fluorine-containing monomer as needed. Alternatively, a divalent fluorine-containing group is randomly introduced to a polymer by polycondensation reaction or cross-coupling reaction as described above of a fluorine-containing monomer of a dihalogenated compound.

Preferred examples of the fluorine-containing monomer include compounds as shown in the following formula (22), which correspond to the above formula (1).

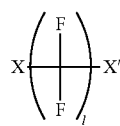

(22)

(In the formula, X and X' are the same or different and represent a halogen atom or a pseudohalide; and l has the same meaning as l in the above formula (1).)

More preferred examples of the dihalogenated compound for forming the fluorine-containing monomer include dihalogenated bisphenol residues obtained by cross-coupling reaction as described above of a fluorine-containing group of the dihalogenated compound as shown in the above formula (22) and a dihalogenated aromatic compound for forming a hydrophobic group or a hydrophilic group as described above to form carbon-carbon bond.

For example, the fluorine-containing group which are bonded to the dihalogenated aromatic compound for forming a hydrophobic group or a hydrophilic group via carbon-carbon bond or a carbon-silicon bond is formed by a dihalogenated fluorine-containing group as shown in the above formula (22) and a hydrophobic group as shown in the above formula (2"), and is shown in the following formula.

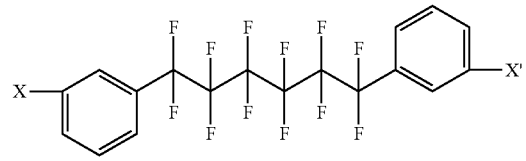

(22')

(In the formula, X and X' are the same or different and represent a halogen atom or a pseudohalide.)

In this method, any method known in the art can be used including a method by dissolving a first oligomer or a second oligomer and a monomer for forming a hydrophilic unit in a solvent such as N,N-dimethylacetamide or dimethyl sulfoxide, and then by polymerizing them in the presence of a catalyst such as bis(1,5-cyclooctadiene)nickel (0).

The reaction temperature in the cross-coupling reaction is, for example, from −100 to 300° C., and preferably from −50 to 200° C. The reaction time is, for example, from 1 to 20 hours, and preferably from 2 to 5 hours.

By this operation, a precursor polymer for an anion exchange resin (preferably a precursor polymer for an anion exchange resin in which the hydrophobic unit contains a fluorine-containing group as shown in the following formula (23); a precursor polymer for an anion exchange resin in which the hydrophilic unit contains a fluorine-containing group as shown in the following formula (23'); or a precursor polymer for an anion exchange resin containing a fluorine-containing group randomly as shown in the following formula (23")) is obtained.

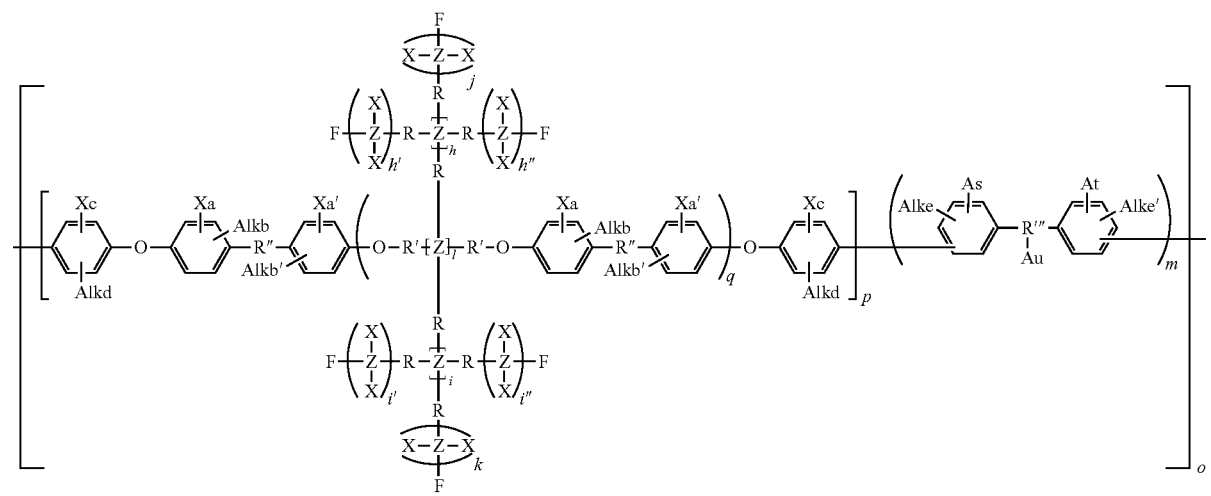

(23)

(In the formula, each R has the same meaning as R in the above formula (1); each R' has the same meaning as R' in the above formula (1'); each R" has the same meaning as R in the above formula (2); each R'" has the same meaning as R in the above formula (3); each Alk has the same meaning as Alk in the above formula (2); each X has the same meaning as X in the above formula (1); each A has the same meaning as A in the above formula (3); each Z has the same meaning as Z in the above formula (1); h, h', h", i", j, k and l have the same meaning as h, h', h", i", j, k and l in the above formula (1); a, a', b, b', c, d, e, e', s, t, and u are the same or different and represent an integer of 0 to 4; q has the same meaning as q in the above formula (7); p and m represent the blending ratio; and o represents an integer of 1 to 100.)

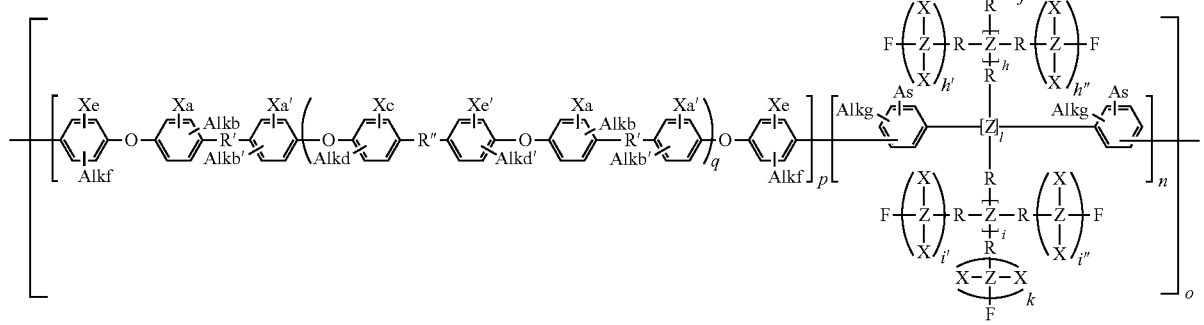

(23')

(In the formula, each R has the same meaning as R in the above formula (1); each R' has the same meaning as R in the above formula (2); each R" has the same meaning as R in the above formula (2); each Alk has the same meaning as Alk in the above formula (2); each X has the same meaning as X in the above formula (1); each A has the same meaning as A in the above formula (3); each Z has the same meaning as Z in the above formula (1); h, h', h", i", j, k and l have the same meaning as h, h', h", i", j, k and l in the above formula (1); a, a', b, b', c, d, e, e', s, t, and u are the same or different and represent an integer of 0 to 4; q has the same meaning as q in the above formula (7); m has the same meaning as m in the above formula (9); p and m represent the blending ratio; and o represents an integer of 1 to 100.)

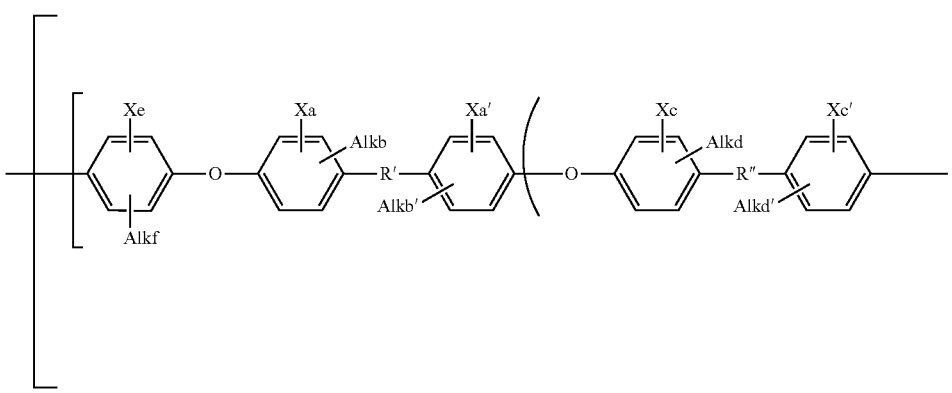

(23")

-continued

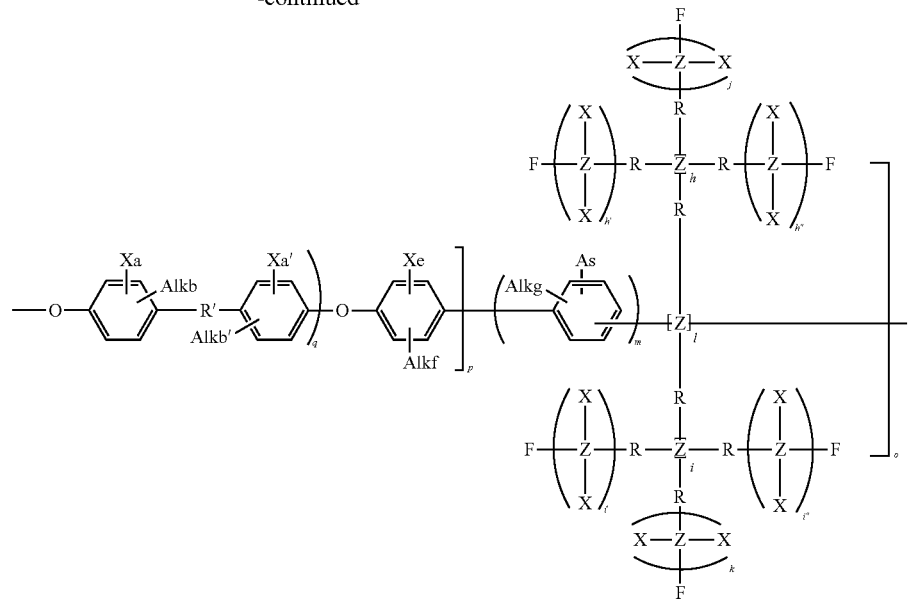

(In the formula, each R has the same meaning as R in the above formula (1); each R' and R" has the same meaning as R in the above formula (2); each Alk has the same meaning as Alk in the above formula (2); each X has the same meaning as X in the above formula (1); each A has the same meaning as A in the above formula (3); each Z has the same meaning as Z in the above formula (1); h, h', h", i", j, and k have the same meaning as h, h', h", i", j, and k in the above formula (1); a, a', b, b', c, c', d, d', e, f, g, and s are the same or different and represent an integer of 0 to 4; q has the same meaning as q in the above formula (7); p, m and l represent the blending ratio; and o represents an integer of 1 to 100.)

Particularly preferably, as the precursor polymer for the anion exchange resin, a precursor polymer for an anion exchange resin as shown in the following formula (24); a precursor polymer for an anion exchange resin as shown in the following formula (24'); a precursor polymer for an anion exchange resin as shown in the following formula (24"); or a precursor polymer for an anion exchange resin as shown in the following formula (24''') is obtained.

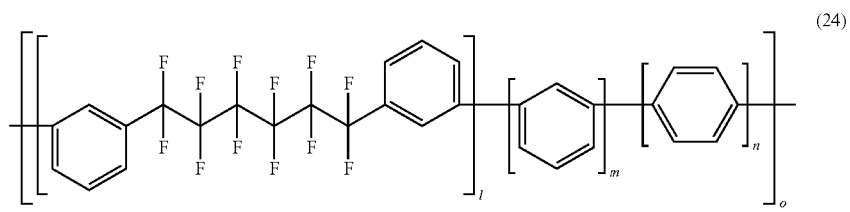

(24)

(In the formula, l, m, and n represent the blending ratio; and o has the same meaning as o in the above formula (12).)

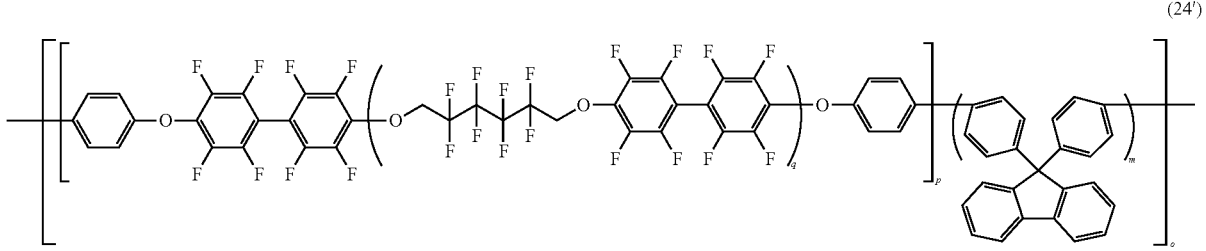

(24')

(In the formula, q has the same meaning as q in the above formula (7); p and m represent the blending ratio; and o has the same meaning as o in the above formula (12).)

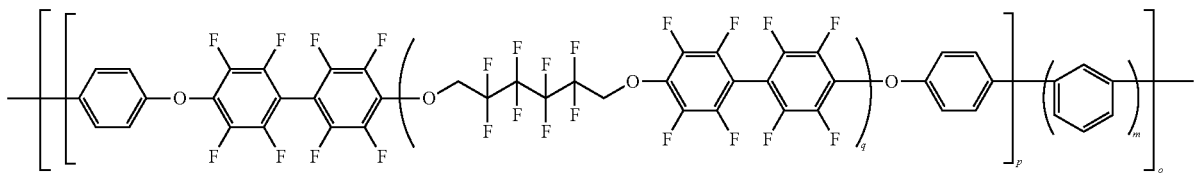

(24″)

(In the formula, q has the same meaning as q in the above formula (7); p and m represent the blending ratio; and o has the same meaning as o in the above formula (12).)

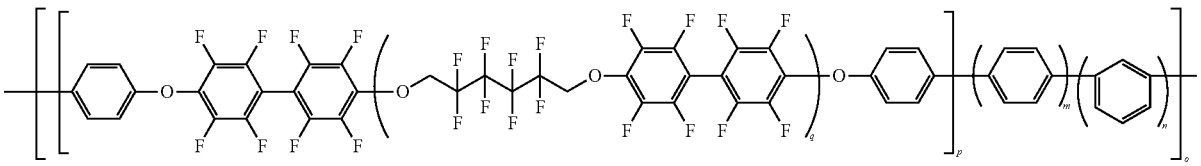

(24‴)

(In the formula, q has the same meaning as q in the above formula (7); p, m and n represent the blending ratio; and o has the same meaning as o in the above formula (12).)

In the method, a substituent group having an anion exchange group is then introduced to the precursor polymer for an anion exchange resin.

The method for introducing the substituent group having an anion exchange group is not particularly limited, and any method known in the art can be used.

For example, a substituent group having an anion exchange group is introduced by chloroalkylating the precursor polymer for an anion exchange resin by chloroalkylation reaction, and then by quaternizing (for example, ammonizing) the chloroalkylated precursor polymer for an anion exchange resin.

The method for chloroalkylation reaction is not particularly limited, and any method known in the art can be used including a method by dissolving the precursor polymer for an anion exchange resin in a solvent such as tetrachloroethane, and then by immersing the solution of the precursor polymer for an anion exchange resin in chloromethyl methyl ether in the presence of Lewis acid such as, for example, iron chloride or zinc chloride as a catalyst to produce a chloroalkylated product.

The reaction temperature in the chloroalkylation reaction is, for example, from 20 to 120° C., and is preferably from 35 to 100° C. The reaction time is, for example, from 24 to 168 hours, and is preferably from 36 to 120 hours.

By this operation, a chloroalkylated precursor polymer for an anion exchange resin can be obtained.

In the quaternizing reaction, a substituent group having an anion exchange group is introduced by optionally forming the chloroalkylated precursor polymer for an anion exchange resin into a membrane by any method known in the art, and then by adding a compound such as amines, phosphines, phosphazenes, sulfides, or boron compounds in a suitable ratio, in order to substitute the chlorine atom of the chloroalkyl group in the chloroalkylated precursor polymer with the compound.

Examples of the amine include secondary amines such as, for example, dimethylamine, diethylamine, diallylamine, di-n-propylamine, di-n-butylamine, and di-n-pentylamine; tertiary amines such as, for example, trimethylamine, N,N-dimethylethanolamine, triethylamine, triallylamine, tri-n-propylamine, tri-n-butylamine, tri-n-pentylamine, and tri-n-hexylamine; cyclic amines such as, for example, pyridine, quinoline and imidazole; and guanizine, for example.

The amine may be used alone or in combination with two or more kinds.

The reaction temperature in the quaternizing reaction is, for example, from 0 to 100° C., and preferably from 20 to 80° C. The reaction time is, for example, from 24 to 72 hours, and preferably from 48 to 72 hours.

In the method, the precursor polymer for an anion exchange resin can be quaternized, for example, in the form of solution without the formation into a film.

In this method, compounds such as amines, phosphines, phosphazenes, sulfides, and boron compounds, which are described above, are optionally removed by any method known in the art.

By this operation, a substituent group having an anion exchange group is introduced to the precursor polymer for an anion exchange resin as described above to obtain an anion exchange resin (preferably an anion exchange resin as shown in the above formula (12) or an anion exchange resin as shown in the above formula (12'), particularly preferably an anion exchange resin as shown in the above formula (13), an anion exchange resin as shown in the above formula (13'), an anion exchange resin as shown in the above formula (13″), or an anion exchange resin as shown in the above formula (13‴)).

The ion exchange capacity of the anion exchange resin is, for example, from 0.1 to 4.0 meq./g, and is preferably from 0.6 to 3.0 meq./g.

The ion exchange capacity can be calculated by the following equation (24). [ion exchange capacity (meq./g)] =the amount of the ion exchange group introduced per hydrophilic unit×the repeating number of the hydrophilic unit×1000/(the molecular weight of the hydrophobic unit× the repeating number of the hydrophobic unit+the molecular weight of the hydrophilic unit×the repeating number of the hydrophilic unit+the molecular weight of the ion exchange group × the repeating number of the hydrophilic unit) (24)

The amount of the ion exchange group introduced is defined as the number of the ion exchange group per hydrophilic group. The amount of the anion exchange group introduced is the number of moles (mol) of the anion exchange group as described above which is introduced in the main chain or the side chain of the hydrophilic group.

The anion exchange resin has: divalent hydrophobic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; divalent hydrophilic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, the aromatic ring or at least one of the aromatic rings having an anion exchange group; and divalent fluorine-containing groups as shown in the following formula (1); in which the divalent hydrophobic groups are repeated via ether bond, thioether bond, or carbon-carbon bond to form a hydrophobic unit; in which the divalent hydrophilic groups are repeated via ether bond, thioether bond, or carbon-carbon bond to form a hydrophilic unit; in which the hydrophobic unit and the hydrophilic unit are bonded via ether bond, thioether bond, or carbon-carbon bond; and in which the divalent fluorine-containing groups as shown in the formula (1) are bonded via ether bond, thioether bond, a carbon-silicon bond, or carbon-carbon bond in a main chain of the hydrophobic unit and/or the hydrophilic unit and/or randomly in a moiety other than the units.
the main chain or main chains of the hydrophobic unit and/or the hydrophilic unit. Therefore, since the divalent fluorine-containing group is introduced in the anion exchange resin, the anion exchange resin has improved chemical properties (durability and solubility) and mechanical properties (flexibility).

In particular, if there is a hydrophilic unit in which the hydrophilic group is repeated via carbon-carbon bond, since there is has no ether bond, the anion exchange resin has an improved durability such as alkali resistance. More specifically, when there is an ether bond in the hydrophilic unit, the decomposition by hydroxide ion (OH⁻) as described below may occur, and the anion exchange resin may have insufficient alkali resistance.

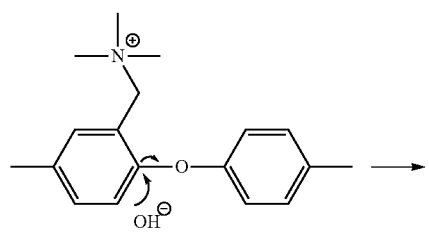

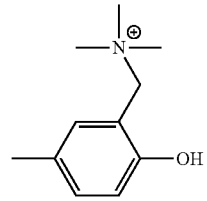

In contrast, since the hydrophilic unit of the anion exchange resin having a hydrophilic unit in which hydrophilic groups are repeated via carbon-carbon bond does not have an ether bond, the decomposition by the mechanism as described above does not occur, and therefore the anion exchange resin has an improved durability such as alkali resistance.

The present invention includes an electrolyte layer for a fuel cell (an electrolyte membrane for a fuel cell) obtained by using the anion exchange resin, and a fuel cell having the electrolyte layer for the fuel cell as the electrolyte layer.

FIG. 1 is a schematic diagram showing an embodiment of the fuel cell of the present invention. In FIG. 1, this fuel cell 1 has a cell S for the fuel cell. The cell S for the fuel cell has a fuel side electrode 2, an oxygen side electrode 3, and an electrolyte membrane 4. The fuel side electrode 2 and the oxygen side electrode 3 are oppositely disposed by interposing the electrolyte membrane 4 between them.

As the electrolyte membrane 4, the anion exchange resin as described above can be used. That is, the electrolyte membrane 4 includes the anion exchange resin as described above.

The electrolyte membrane 4 may be reinforced with a reinforcing material known in the art, for example, a porous substrate. Further, the electrolyte membrane 4 may be processed by various procedures including biaxially orientation procedure for controlling the molecular orientation, heat procedure for controlling the crystallinity and the residual stress. A filler known in the art can be added to the electrolyte membrane 4 in order to improve the mechanical strength of the electrolyte membrane 4. The electrolyte membrane 4 and a reinforcing material such as glass unwoven fabric may be pressed to form the complex.

A commonly-used various additive, for example, a compatibilizing agent for improving the compatibility, an antioxidant for preventing the degradation of the resin, and an antistatic agent or a lubricant for improving the handling in forming into the film can be suitably included in the electrolyte membrane 4, as long as the additive does not have an effect on the processability and properties of the electrolyte membrane 4.

The thickness of the electrolyte membrane 4 is not particularly limited, and is suitably selected depending on the purpose and application.

The thickness of the electrolyte membrane 4 is, for example, from 1.2 to 350 μm, and preferably from 5 to 200 μm.

The fuel side electrode 2 is contacted with one surface of the electrolyte membrane 4 so as to be disposed oppositely. For example, the fuel side electrode 2 has the catalyst layer (the battery electrode catalyst layer) in which a catalyst is supported on a porous carrier.

The porous carrier is not particularly limited, and example of the porous carrier includes a water-repellent carrier such as carbon.

The catalyst of the electrode is not particularly limited, and examples of the catalyst include group 8-10 elements in periodic table (according to IUPAC Periodic Table of the Elements (version date 19 Feb. 2010); the same shall apply hereinafter) such as, for example, platinum group elements (Ru, Rh, Pd, Os, Ir, and Pt), and iron group elements (Fe, Co, and Ni); or group 11 elements in periodic table such as, for example, Cu, Ag, and Au, and combination thereof. Preferred example of the catalyst includes Pt (platinum).

For the fuel side electrode 2, for example, the porous carrier and the catalyst are dispersed in an electrolyte solution known in the art to prepare an ink for an electrode. Optionally, the viscosity of the ink for the electrode is adjusted by blending with a suitable amount of an organic solvent such as alcohols, and the ink for the electrode is applied to one surface of the electrolyte membrane 4 by any method known in the art (for example, spraying method or die coater method), and dried at a determined temperature to produce the fuel side electrode 2 as the thin electrode membrane attached to the surface of the electrolyte membrane 4.

The amount of the catalyst for the electrode supported on the fuel side electrode 2 is not particularly limited, and the amount is, for example, from 0.1 to 10.0 mg/cm$^2$, and preferably from 0.5 to 5.0 mg/cm$^2$.

In the fuel side electrode 2, a fuel to be supplied is reacted with a hydroxide ion (OH$^-$) passed through the electrolyte membrane 4 to form electron (e$^-$) and water (H$_2$O), as described below. For example, when the fuel is hydrogen (H$_2$), only electron (e$^-$) and water (H$_2$O) are formed. When the fuel is an alcohol, electron (e$^-$), water (H$_2$O), and carbon dioxide (CO$_2$) are formed. When the fuel is hydrazine (NH$_2$NH$_2$), electron (e$^-$), water (H$_2$O), and nitrogen (N$_2$) are formed.

The oxygen side electrode 3 is contacted with the other surface of the electrolyte membrane 4 so as to be disposed oppositely. For example, the oxygen side electrode 3 has the catalyst layer (the battery electrode catalyst layer) in which a catalyst is supported on a porous carrier.

For the oxygen side electrode 3, for example, the porous carrier and the catalyst are dispersed in an electrolyte solution known in the art to prepare an ink for the electrode. Optionally, the viscosity of the ink for the electrode is adjusted by blending with a suitable amount of an organic solvent such as alcohols, and the ink for the electrode is applied to the other surface of the electrolyte membrane 4 by any method known in the art (for example, spraying method or die coater method), and dried at a determined temperature to produce the oxygen side electrode 3 as the thin electrode membrane attached to the other surface of the electrolyte membrane 4.

Therefore, the electrolyte membrane 4, the fuel side electrode 2, and the oxygen side electrode 3 form a membrane-electrode assembly by attaching the fuel side electrode 2 in the form of thin membrane to the one surface of the electrolyte membrane 4, and attaching the oxygen side electrode 3 in the form of thin membrane to the other surface of the electrolyte membrane 4.

The amount of the catalyst for the electrode supported on the oxygen side electrode 3 is not particularly limited, and the amount is, for example, from 0.1 to 10.0 mg/cm$^2$, and preferably from 0.5 to 5.0 mg/cm$^2$.

In the oxygen side electrode 3, oxygen (O$_2$) to be supplied, water (H$_2$O) passed through the electrolyte membrane 4, and an electron (e$^-$) passed through an external circuit 13 are reacted to form a hydroxide ion (OH$^-$), as described below.

The cell S for the fuel cell further has a fuel supplying member 5 and an oxygen supplying member 6. The fuel supplying member 5 is composed of a gas impermeable conductive member, and one surface of the fuel supplying member 5 is contacted with the fuel side electrode 2 so as to be disposed oppositely. A fuel side path 7 for contacting the fuel with the whole of the fuel side electrode 2 is formed as a winding groove on one surface of the fuel supplying member 5. A supply inlet 8 and an outlet 9 are perforating through the fuel supplying member 5, and the supply inlet 8 and the outlet 9 are continuously formed on the upstream side edge and the downstream side edge of the fuel side path 7, respectively.

The oxygen supplying member 6 is also composed of a gas impermeable conductive member like the fuel supplying member 5, and one surface of the oxygen supplying member 6 is contacted with the oxygen side electrode 3 so as to be disposed oppositely. An oxygen side path 10 for contacting oxygen (air) with the whole of the oxygen side electrode 3 is also formed as a winding groove on one surface of the oxygen supplying member 6. A supply inlet 11 and an outlet 12 are perforating through the oxygen supplying member 6, and the supply inlet 11 and the outlet 12 are continuously formed on the upstream side edge and the downstream side edge of the oxygen side path 10, respectively.

This fuel cell 1 is actually formed as a stack structure in which a plurality of cells S for the fuel cell as described above is layered. Therefore, the fuel supplying member 5 and the oxygen supplying member 6 are actually formed as a separator, and the fuel side path 7 and the oxygen side path 10 are formed on both surfaces of the members.

The fuel cell 1 has a current collector being formed by a conductive member, not shown in the drawings. The electromotive force generated from the fuel cell 1 can be transmitted outwardly through terminals on the current collector.

In FIG. 1, the fuel supplying member 5 and the oxygen supplying member 6 of the cell S for the fuel cell are bonded via the external circuit 13, and a voltmeter 14 is disposed in the external circuit 13 to measure the generated voltage.

In the fuel cell 1, the fuel is supplied to the fuel side electrode 2 directly without the reforming process, or after the reforming process.

Examples of the fuel include a hydrogen-containing fuel.

The hydrogen-containing fuel is a fuel having hydrogen atom in the molecule. Examples of the hydrogen-containing fuel include hydrogen gas, alcohols, and hydrazines. Preferred examples of the hydrogen-containing fuel include hydrogen gas and hydrazines.

Specific examples of hydrazines include hydrazine (NH$_2$NH$_2$), hydrated hydrazine (NH$_2$NH$_2$.H$_2$O), hydrazine carbonate ((NH$_2$NH$_2$)$_2$CO$_2$), hydrazine hydrochloride (NH$_2$NH$_2$.HCl), hydrazine sulfate (NH$_2$NH$_2$.H$_2$SO$_4$), monomethylhydrazine (CH$_3$NHNH$_2$), dimethylhydrazine ((CH$_3$)$_2$NNH$_2$, CH$_3$NHNHCH$_3$), and carbonhydrazide ((NHNH$_2$)$_2$CO). The listed fuel may be used alone or in combination with two or more kinds.

Among these fuel compounds, carbon-free compounds, i.e., hydrazine, hydrated hydrazine, and hydrazine sulfate do not generate CO and CO$_2$, and do not occur the catalyst poisoning. Therefore, the compounds have an improved durability, and zero-emission can be substantially accomplished.

Although the listed fuel may be used as it is, the listed fuel compound can be used as a solution in water and/or an alcohol (for example, a lower alcohol such as methanol, ethanol, propanol, or isopropanol). In this case, the concentration of the fuel compound in the solution varies depending on the type of the fuel compound, for example, from 1 to 90 percent by mass, and preferably from 1 to 30 percent by mass. The listed solvent may be used alone or in combination with two or more kinds.

The listed fuel compound can be used in the form of gas (for example, steam).

By supplying the fuel to the fuel side path 7 of the fuel supplying member 5 while supplying oxygen (air) to the oxygen side path 10 of the oxygen supplying member 6, on the oxygen side electrode 3, an electron (e$^-$) generated in the fuel side electrode 2 and passed through the external circuit 13, water ($H_2O$) generated in the fuel side electrode 2, and oxygen ($O_2$) are reacted to form a hydroxide ion (OH), as described below. The formed hydroxide ion (OH$^-$) is moved from the oxygen side electrode 3 to the fuel side electrode 2 in the electrolyte membrane 4 being composed of an anion exchange membrane. On the fuel side electrode 2, a hydroxide ion (OH$^-$) passed through the electrolyte membrane 4 and the fuel are reacted to form an electron (e$^-$) and water ($H_2O$). The formed electron (e$^-$) is moved from the fuel supplying member 5 to the oxygen supplying member 6 via the external circuit 13, and supplied to the oxygen side electrode 3. The formed water ($H_2O$) is moved from the fuel side electrode 2 to the oxygen side electrode 3 in the electrolyte membrane 4. The electromotive force was generated by electrochemical reaction on the fuel side electrode 2 and the oxygen side electrode 3 to produce electricity.

Although the operating condition of the fuel cell 1 is not particularly limited, for example, the condition in which the applied pressure on the fuel side electrode 2 is 200 kPa or less, and preferably 100 kPa or less, the applied pressure on the oxygen side electrode 3 is 200 kPa or less, and preferably 100 kPa or less, and the temperature of the cell S for the fuel cell is from 0 to 120° C., and preferably from 20 to 80° C. is selected.

In the fuel cell 1, the electrolyte membrane for a fuel cell having the anion exchange resin having an improved durability as described above is used in the electrolyte membrane 4.

Therefore, the electrolyte membrane for a fuel cell of the present invention obtained by using the anion exchange resin of the present invention, and the fuel cell having the electrolyte membrane for a fuel cell have an improved durability.

The present invention also includes a binder for forming an electrode catalyst layer having the anion exchange resin as described above, an electrode catalyst layer for a fuel cell having the binder for forming an electrode catalyst layer, and the fuel cell having the electrolyte layer for a fuel cell.

Thus, in the fuel cell 1, the anion exchange resin can be included in the binder for forming the electrode catalyst layer during the formation of the fuel side electrode 2 and/or the oxygen side electrode 3.

Specifically, as the method for including the anion exchange resin in the binder for forming an electrode catalyst layer, for example, the binder for forming an electrode catalyst layer is prepared by cutting the anion exchange resin into pieces, and then dissolving the resin in a suitable amount of an organic solvent such as alcohols.

In the binder for forming the electrode catalyst layer, the amount of the anion exchange resin is, for example, from 2 to 10 parts by weight, and preferably from 2 to 5 parts by weight with respect to 100 parts by weight of the binder for forming the electrode catalyst layer.

By using the binder for forming an electrode catalyst layer for the formation of the catalyst layer (the battery electrode catalyst layer) of the fuel side electrode 2 and/or the oxygen side electrode 3, the catalyst layer (the battery electrode catalyst layer) can have the anion exchange resin. Therefore, the fuel cell 1 having the catalyst layer (the battery electrode catalyst layer) including the anion exchange resin can be obtained.

In the fuel cell 1, the binder for forming the electrode catalyst layer including the anion exchange resin having an improve durability as described above is used for the formation of the battery electrode catalyst layer.

Therefore, the binder for forming the electrode catalyst layer of the present invention obtained by using the anion exchange resin of the present invention, and the battery electrode catalyst layer obtained by using the binder for forming the electrode catalyst layer have an improved durability and an improved anion conductivity.

As a result, the fuel cell having the battery electrode catalyst layer has an improved durability and an improved anion conductivity.

Although exemplary embodiments of the present invention have been described hereinabove, the embodiments of the present invention are not limited to these embodiments, but may be suitably modified by those skilled in the art without departing from the scope of the invention.

Exemplary applications of the fuel cell of the present invention includes power supplies of drive motors for automobiles, marine vessels, or aircrafts; and power supplies for communication terminals including mobile phones.

EXAMPLE

Although the present invention is described based on the Example and the Comparative Example, the present invention is not limited to the following Examples.

<Example>

(Synthesis of QPAF6 (l1m0.48n0.62))

<Synthesis of Fluoroalkyl Monomer>

To a 100 mL of a three-necked round-shaped flask equipped with a nitrogen inlet and a Dean Stark trap, dodecafluoro-1,6-diiodohexane (5.54 g, 10.0 mmol), 3-chloroiodobenzene (11.9 g, 50 mmol), and N,N-dimethyl sulfoxide (60 mL) were added. After stirring the mixture to form a homogeneous solution, copper powder (9.53 g, 150 mmol) was added to the solution. The resulting mixture was heated to 120° C., and the reaction was performed for 48 hours.

After the reaction, the reaction was quenched by adding the reaction solution dropwise in 300 mL of 0.1 M aqueous nitric acid, and the resulting black precipitate was collected by filtration. The black solid obtained was washed with 300 mL of methanol and was then filtered to collect the filtrate. The residue was further washed with 100 mL of methanol and was filtered to collect the filtrate. Their filtrates were mixed.

When 400 mL of pure water was added to 400 mL of the collected filtrates, a white solid was precipitated. This solid was collected by filtration, and washed with a mixed solution of water and methanol (water/methanol=1/1). After that, the solid was dried overnight at 60° C. under vacuum to collect a white solid.

By this operation, a fluoroalkyl monomer having a white color as shown in the following formula was obtained in a yield of 84%.

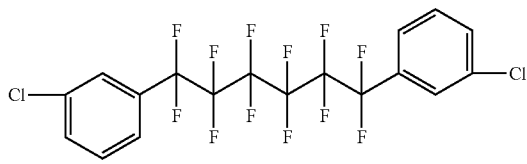 [SMILES: FC(F)(c1cccc(Cl)c1)C(F)(F)C(F)(F)C(F)(F)C(F)(F)C(F)(F)c1cccc(Cl)c1]

<Synthesis of Precursor Polymer for Anion Exchange Resin>

To a 100 mL of a three-necked round-shaped flask equipped with a nitrogen inlet, a mechanical stirrer and a condenser, the fluoroalkyl monomer (0.26 g, 0.5 mmol), 1,4-dichlorobenzene (0.020 g, 0.14 mmol), 1,3-dichlorobenzene (0.060 g, 0.41 mmol), 2,2'-bipyridine (0.41 g, 2.6 mmol), and N,N-dimethylacetamide (3 mL) were added. After stirring the mixture to dissolve the fluoroalkyl monomer, 1,4-dichlorobenzene and 1,3-dichlorobenzene, bis(cycloocta-1,5-diene)nickel (0) (0.72 g, 2.6 mmol) was added. The resulting mixture was heated to 80° C., and the reaction was performed for 3 hours.

The reaction was quenched by adding the reaction mixture dropwise in 100 mL of concentrated hydrochloric acid to precipitate the product. The product was collected by filtration, and was washed with pure water and methanol several times. After that, the product was dried overnight at 60° C. under vacuum.

By this operation, a precursor polymer of the anion exchange resin PAF6 having a white color as shown in the following formula (l=1, m=0.88, n=0.22) was obtained in a yield of 86%.

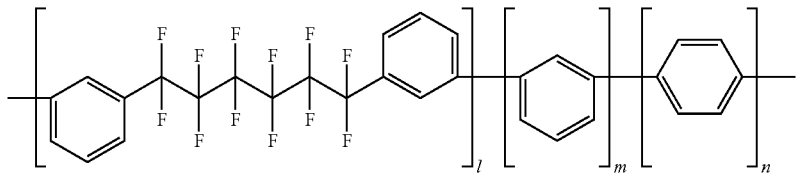

<Introduction of Anion Exchange Group>
(Chloromethylation Reaction)

To a 100 mL of a glass reactor, the precursor polymer for anion exchange resin (0.20 g) and 1,1,2,2-tetrachloroethane (9 ml) were added. After stirring the mixture to dissolve the precursor polymer for anion exchange resin, in a glove box under argon, chloromethyl methyl ether (5 ml) and zinc chloride (0.5 mol/L solution in tetrahydrofuran) (1 ml) were added, and the reaction was performed at 80° C. for 5 days.

The reaction was quenched by adding the reaction mixture dropwise in methanol to precipitate the product. The product was collected by filtration, and was washed with methanol several times. After that, the product was dried overnight at 60° C. under vacuum.

By this operation, a chloromethylated precursor polymer for anion exchange resin was obtained.
(Forming into Membrane)

The chloromethylated precursor polymer for anion exchange resin was formed into the membrane by solution casting method.

That is, the chloromethylated precursor polymer for anion exchange resin (0.1 g) was dissolved in 1,1,2,2-tetrachloroethane (2 ml), and the solution was filtered through a syringe filled with cotton. The filtrate was cast on a glass plate wound with silicone rubber in a size of 3 cm×4 cm, and the plate was kept on a hot plate at 50° C. which was adjusted horizontally. By the operation, the filtrate was dried to obtain a transparent membrane having a thickness of about 50 μm.
(Quaternizing Reaction)

When the membrane of the chloromethylated precursor polymer for anion exchange resin was immersed in 45 mass % aqueous solution of trimethylamine for 2 days, the precursor polymer for anion exchange resin was dissolved to form a homogeneous solution. After adding the solution dropwise in 200 mL of 1M HCl aqueous solution, the resulting solution was flowed in a dialysis tube (molecular weight cut off 1 kDa) and the dialysis was performed. The solvent was removed from the dialyzed solution to form a dark brown solid.

The solid obtained (0.1 g) was dissolved in N,N-dimethyl acetamide (2 mL) to form a solution, and the solution was filtered through a syringe filled with cotton. The filtrate was cast on a glass plate wound with silicone rubber in a size of 3 cm×4 cm, and the plate was kept on a hot plate at 50° C. By the operation, the filtrate was dried to obtain a transparent membrane having a thickness of about 50 μm.

Since the counter ion of the ion exchange group (ammonio group) in the membrane is chloride, the membrane was immersed in 1 mol/L potassium hydroxide aqueous solution for 2 days and was washed with degassed pure water to convert chloride type to hydroxide type.

The similar operations were performed except that the amounts of reagents used were changed to obtain QPAF6 (l1 m1·ln0), QPAF6 (l1m0.48n0.62), and QPAF6 (l1m0.24n0.86), each of which has a different chain length and IEC.

<Comparative Example>
(Synthesis of (QPE-bl-10r (plm3.13))
<Synthesis of Hydrophobic Monomer>

To a 100 mL of three-necked round-shaped flask equipped with a nitrogen inlet and a Dean Stark trap, decafluorobiphenyl (5.00 g, 14.97 mmol), 4-chlolophenol (4.81 g, 37.41 mmol), and N,N-dimethylacetamide (52 mL) were added. After stirring the mixture to form a homogeneous solution, potassium carbonate (12.93 g, 93.53 mmol) was added to the solution. The resulting mixture was heated to 30° C., and the reaction was performed for 3 hours.

After the reaction, the reaction was quenched by adding the reaction solution dropwise in 300 mL of water, and the resulting white precipitate was collected by filtration. The white solid obtained was washed with a mixed solvent of methanol (100 mL) and pure water (200 mL), and was then dried at 60° C. under vacuum to collect a white solid.

By this operation, a hydrophobic monomer having a white color, which was composed of aromatic rings and ether bonds as shown in the following formula, was obtained in a yield of 94%.

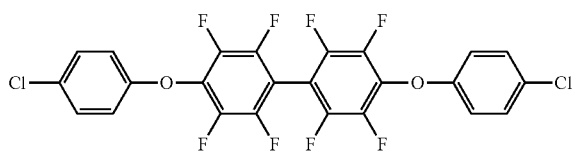 [SMILES: Fc1c(F)c(-c2c(F)c(F)c(Oc3ccc(Cl)cc3)c(F)c2F)c(F)c(F)c1Oc1ccc(Cl)cc1]

<Synthesis of Precursor Polymer for Anion Exchange Resin>

To a 100 mL of three necked round-shaped flask equipped with a nitrogen inlet, a mechanical stirrer and a Dean Stark trap, the hydrophobic monomer (2.23 g, 4.04 mmol), 9,9-bis(4-(-chlorophenyl)fluorene (1.25 g, 3.23 mmol), 2,2'-bipyridine (2.84 g, 18.18 mmol), N-methylpyrrolidone (60 mL), and toluene (30 mL) were added. The mixture was heated to 150° C., and the dehydration was performed for 3 hours. After that, toluene was removed. After the reaction system was cooled to room temperature, bis(1,5-cyclooctadiene)nickel (0) (5.00 g, 18.18 mmol) was added. The resulting mixture was heated to 60° C., and the reaction was performed for 3 hours.

The reaction was quenched by adding the reaction mixture dropwise in 100 mL of concentrated hydrochloric acid to precipitate the product. The product was collected by filtration, and was washed with pure water and methanol several times. After that, the product was dried overnight at 60° C. under vacuum.

By this operation, a precursor polymer of the anion exchange resin (p=1, m=0.80) having a white color as shown in the following formula (l=1, m=0.88, n=0.22) was obtained in a yield of 84%.

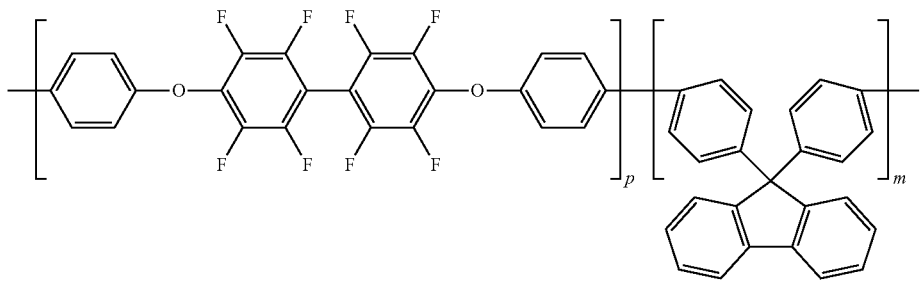

<Introduction of Anion Exchange Group>
(Chloromethylation Reaction)

To a 100 mL of a glass reactor, the precursor polymer for anion exchange resin (1.10 g) and 1,1,2,2-tetrachloroethane (25 ml) were added. After stirring the mixture to dissolve the precursor polymer for anion exchange resin, in a glove box under argon, chloromethyl methyl ether (7 ml) and zinc chloride (0.5 mol/L solution in tetrahydrofuran) (2 ml) were added, and the reaction was performed at 35° C. for 5 days.

The reaction was quenched by adding the reaction mixture dropwise in methanol to precipitate the product. The product was collected by filtration, and was washed with methanol several times. After that, the product was dried overnight at 60° C. under vacuum.

By this operation, a chloromethylated precursor polymer for anion exchange resin was obtained.
(Forming into Membrane)

The chloromethylated precursor polymer for anion exchange resin was formed into the membrane by solution casting method.

That is, the chloromethylated precursor polymer for anion exchange resin (0.1 g) was dissolved in 1,1,2,2-tetrachloroethane (2 ml), and the solution was filtered through a syringe filled with cotton. The filtrate was cast on a glass plate wound with silicone rubber in a size of 3 cm×4 cm, and the plate was kept it on a hot plate at 50° C. which was adjusted horizontally. By the operation, the filtrate was dried to obtain a transparent membrane having a thickness of about 50 μm.
(Quaternizing Reaction)

When the membrane of the chloromethylated precursor polymer for anion exchange resin was immersed in 45 mass % aqueous solution of trimethylamine at room temperature for 2 days Since the counter ion of the ion exchange group (ammonio group) in the membrane is chloride, the membrane was immersed in 1 mol/L potassium hydroxide aqueous solution for 2 days and was washed with degassed pure water to convert chloride type to hydroxide type.

The similar operations were performed except that the amounts of reagents used were changed to obtain QPE-bl-10r (plm3.13) which has a different chain length and IEC.
(Evaluation)
<Solubility Test>

The solubility of the anion exchange resins QPAF6 and QPE-bl-10r which were obtained in Example and Comparative Example were evaluated by dissolving 100 mg of their samples in 1 mL of a solvent.

As a result, Comparative Example QPE-bl-10r was not soluble in a lower alcohol (e.g., methanol) which is a polar protic solvent. In contrast, Example QPAF6 was easily soluble in the lower alcohol, and the solubility was improved due to the introduction of the fluorine-containing group.
<Measurement of Hydroxide Ion Conductivity>

The hydroxide ion conductivities of the anion exchange resins were measured. The measurement was performed in water at 30° C. using alternating current four-terminal method (300 mV, 10-100000 Hz). The measurement device used was Solartolon 1255B/1287, and the probe used was a gold wire having a diameter of 1 mm. Each of the samples for the measurement was produced by cutting the obtained anion exchange resin into pieces having a width of 1 cm and a thickness of 50 μm, and the piece was secured at a distance between probes of 1 cm. The hydroxide ion conductivity σ(S/cm) at the temperature was calculated by the following equation from the distance between probes L (1 cm), impedance Z (Ω), and the cross-sectional area of the membrane (cm²).

$$\sigma = (L/Z) \times 1/A$$

Figure 2:
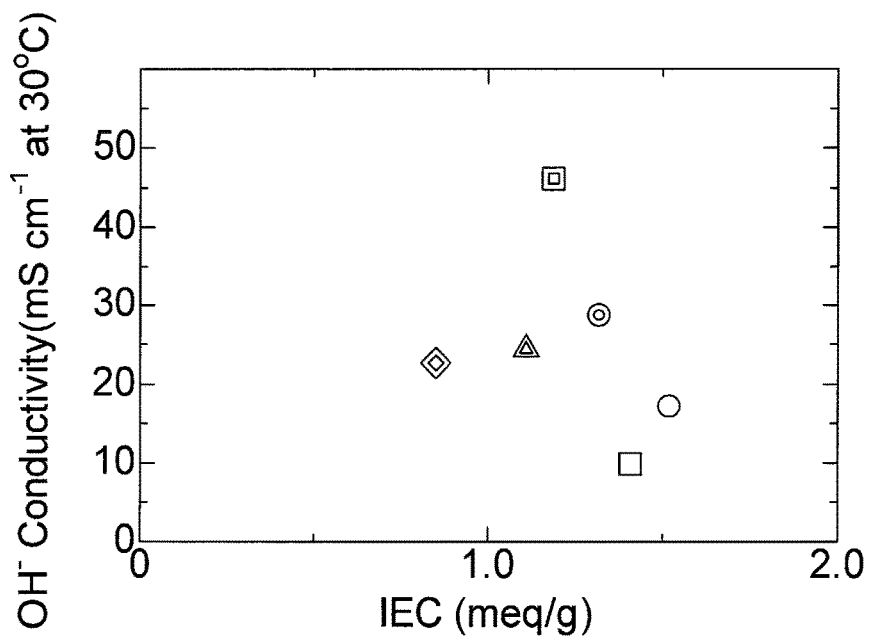
FIG. 2 is a graph showing measurement results for the hydroxide ion conductivity of the anion exchange film.

The results are shown in FIG. 2.

According to FIG. 2, while QPAF6 has a lower IEC than that of QPE-bl-10r, QPAF6 has a higher hydroxide ion conductivity than that of QPE-bl-10r. It is thought to be because the flexibility is improved due to the introduction of fluorine-containing group in the main chain, because a cluster can be easily formed at the hydrophilic moiety, and because a higher-order structure having highly connected hydroxide ion conductive paths is formed.

<Tensile Strength Test>

The test was performed in a chamber in which the temperature and the humidity were constantly controlled, using Shimazu universal testing instrument Autogragh AGS-J500N equipped with Toshin Kogyo temperature control unit Bethel-3. The dumbbell shaped sample for measurement (DIN-53504-53) in a size of 12 mm×2 mm (the area of the whole sample: 35 mm×6 mm) of the anion exchange resin was maintained at 80° C., 60% RH, and the sample was then stretched at a speed of 10 mm/min. The resulting stress-strain curve (FIG. 3) was used to evaluate the mechanical strength of the membrane in plane-direction. In the measurement condition, the waiting time for stabilizing the temperature and the humidity was 3 hours.

Figure 3:
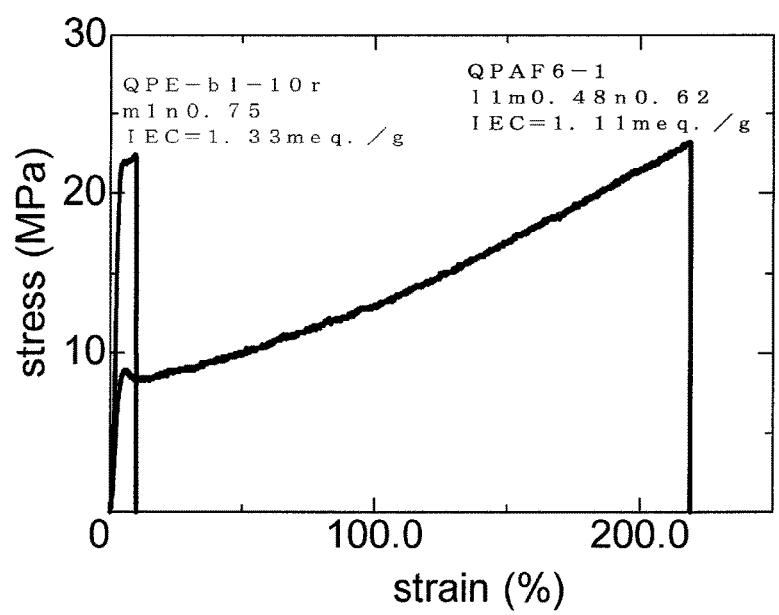
FIG. 3 is a graph showing measurement results for the tensile strength of the anion exchange film.

According to FIG. 3, the membrane in which fluorine-containing group is introduced has a remarkably-improved maximum strain in comparison with the conventional aromatic hydrocarbon membrane having no fluorine-containing group, and the flexibility of the membrane is remarkably improved.

DENOTATION OF REFERENCE NUMERALS 1 fuel cell
2 fuel side electrode
3 side electrode
4 electrolyte membrane
S cell for the fuel cell

What is claimed is:

1. An anion exchange resin, comprising:
divalent hydrophobic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond;
divalent hydrophilic groups being composed of one aromatic ring, or being composed of a plurality of aromatic rings which are bonded to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, the aromatic ring or at least one of the aromatic rings having an anion exchange group; and
divalent fluorine-containing groups as shown in formula (11');
wherein the divalent hydrophobic groups are repeated via ether bond, thioether bond, or carbon-carbon bond to form a hydrophobic unit;
wherein the divalent hydrophilic groups are repeated via ether bond, thioether bond, or carbon-carbon bond to form a hydrophilic unit;
wherein the hydrophobic unit and the hydrophilic unit are bonded via ether bond, thioether bond, or carbon-carbon bond; and
wherein the divalent fluorine-containing group as shown in formula (11') is bonded via ether bond, thioether bond, a carbon-silicon bond, or carbon-carbon bond in the main chain or main chains of the hydrophobic unit and/or the hydrophilic unit

(11')

wherein, l is an integer of 2 to 12.

2. The anion exchange resin according to claim 1, wherein each of the hydrophilic groups comprises a bisphenol residue which may be substituted with a halogen atom, a pseudohalide, or an alkyl group, as shown in formula (2)

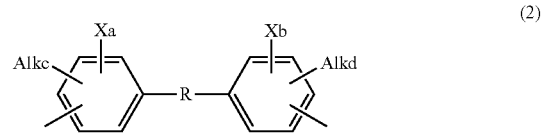

(2)

wherein, R is a hydrocarbon group, a silicon-containing group, a nitrogen-containing group, a phosphorus-containing group, an oxygen-containing group, a sulfur-containing group, which may be substituted with a halogen atom or a pseudohalide, or direct bond; each Alk is the same or different and is an alkyl group; each X is the same or different and is a halogen atom or a pseudohalide; and a, b, c, and d are the same or different and is an integer of 0 to 4.

3. The anion exchange resin according to claim 1, wherein each of the hydrophilic groups is:
a bisphenol residue substituted with a substituent group having the anion exchange group, as shown in formula (3),

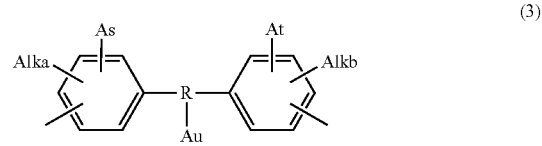

(3)

wherein, R is a hydrocarbon group, a silicon-containing group, a nitrogen-containing group, a phosphorus-containing group, an oxygen-containing group, a sulfur-containing group, an aromatic group, which may be substituted with a substituent group having the anion exchange group, or direct bond; each Alk is the same or different and is an alkyl group; each A is the same or different and is a substituent group having an anion exchange group; a and b are the same or different and is an integer of 0 to 4; and s, t, and u are the same or different and is an integer of 0 to 4, and at least one of s, t, and u is 1 or more and/or
an o-, m- or p-phenylene group substituted with a substituent group having the anion exchange group, as shown in formula (3'),

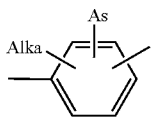

(3')

wherein, Alk is an alkyl group; A is a substituent group having an anion exchange group; a is an integer of 0 to 4; and s is an integer of 1 to 4.

4. The anion exchange resin according to claim 1, wherein I in the divalent fluorine-containing groups as shown in formula (11') ranges from 2 to 6.

5. An electrolyte membrane for a fuel cell, comprising the anion exchange resin according to claim 1.

6. A binder for forming an electrode catalyst layer, comprising the anion exchange resin according to claim 1.

7. The anion exchange resin according to claim 2, wherein each of the hydrophilic groups is:

a bisphenol residue substituted with a substituent group having the anion exchange group, as shown in formula (3),

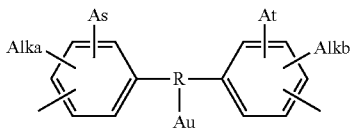

(3)

wherein, R is a hydrocarbon group, a silicon-containing group, a nitrogen-containing group, a phosphorus-containing group, an oxygen-containing group, a sulfur-containing group, an aromatic group, which may be substituted with a substituent group having the anion exchange group, or direct bond; each Alk is the same or different and is an alkyl group; each A is the same or different and is a substituent group having an anion exchange group; a and b are the same or different and is an integer of 0 to 4; and s, t, and u are the same or different and is an integer of 0 to 4, and at least one of s, t, and u is 1 or more and/or an o-, m- or p-phenylene group substituted with a substituent group having the anion exchange group, as shown in formula (3'),

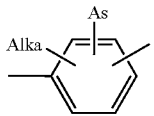

(3')

wherein, Alk is an alkyl group; A is a substituent group having an anion exchange group; a is an integer of 0 to 4; and s is an integer of 1 to 4.

8. The anion exchange resin according to claim 2, wherein I in the divalent fluorine-containing groups in formula (11') ranges from 2 to 6.

9. The anion exchange resin according to claim 3, wherein I in the divalent fluorine-containing groups in formula (11') ranges from 2 to 6.

10. The electrolyte membrane for a fuel cell according to claim 5, wherein each of the hydrophilic groups comprises a bisphenol residue which may be substituted with a halogen atom, a pseudohalide, or an alkyl group, as shown in formula (2)

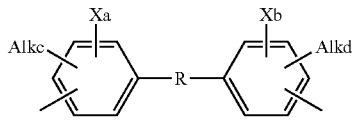

(2)

wherein, R is a hydrocarbon group, a silicon-containing group, a nitrogen-containing group, a phosphorus-containing group, an oxygen-containing group, a sulfur-containing group, which may be substituted with a halogen atom or a pseudohalide, or direct bond; each Alk is the same or different and is an alkyl group; each X is the same or different and is a halogen atom or a pseudohalide; and a, b, c, and d are the same or different and is an integer of 0 to 4.

11. The electrolyte membrane for a fuel cell according to claim 5, wherein each of the hydrophilic groups is:

a bisphenol residue substituted with a substituent group having the anion exchange group, as shown in following formula (3),

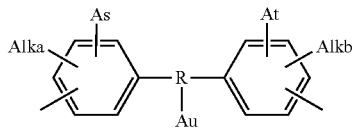

(3)

wherein, R is a hydrocarbon group, a silicon-containing group, a nitrogen-containing group, a phosphorus-containing group, an oxygen-containing group, a sulfur-containing group, an aromatic group, which may be substituted with a substituent group having the anion exchange group, or direct bond; each Alk is the same or different and is an alkyl group; each A is the same or different and is a substituent group having an anion exchange group; a and b are the same or different and is an integer of 0 to 4; and s, t, and u are the same or different and is an integer of 0 to 4, and at least one of s, t, and u is 1 or more and/or an o-, m- or p-phenylene group substituted with a substituent group having the anion exchange group, as shown in formula (3'),

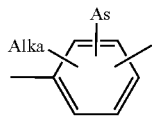

(3')

wherein, Alk is an alkyl group; A is a substituent group having an anion exchange group; a is an integer of 0 to 4; and s is an integer of 1 to 4.

12. The electrolyte membrane for a fuel cell according to claim 5, wherein I in the divalent fluorine-containing groups as shown in formula (11') ranges from 2 to 6.

13. The binder for forming an electrode catalyst layer according to claim 6, wherein each of the hydrophilic groups comprises a bisphenol residue which may be substituted with a halogen atom, a pseudohalide, or an alkyl group, as shown in formula (2),

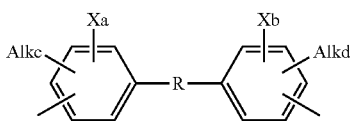

wherein, R is a hydrocarbon group, a silicon-containing group, a nitrogen-containing group, a phosphorus-containing group, an oxygen-containing group, a sulfur-containing group, which may be substituted with a halogen atom or a pseudohalide, or direct bond; each Alk is the same or different and is an alkyl group; each X is the same or different and is a halogen atom or a pseudohalide; and a, b, c, and d are the same or different and is an integer of 0 to 4.

14. The binder for forming an electrode catalyst layer according to claim 6, wherein each of the hydrophilic groups is:

a bisphenol residue substituted with a substituent group having the anion exchange group, as shown in formula (3),

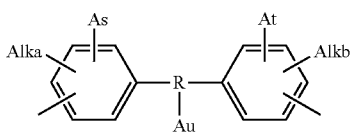

wherein, R is a hydrocarbon group, a silicon-containing group, a nitrogen-containing group, a phosphorus-containing group, an oxygen-containing group, a sulfur-containing group, an aromatic group, which may be substituted with a substituent group having the anion exchange group, or direct bond; each Alk is the same or different and is an alkyl group; each A is the same or different and is a substituent group having an anion exchange group; a and b are the same or different and is an integer of 0 to 4; and s, t, and u are the same or different and is an integer of 0 to 4, and at least one of s, t, and u is 1 or more and/or an o-, m- or p-phenylene group substituted with a substituent group having the anion exchange group, as shown in formula (3'),

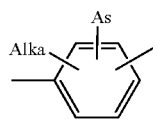

wherein, Alk is an alkyl group; A is a substituent group having an anion exchange group; a is an integer of 0 to 4; and s is an integer of 1 to 4.

15. The binder for forming an electrode catalyst layer according to claim 6, wherein l in the divalent fluorine-containing groups as shown in formula (11') ranges from 2 to 6.

* * * * *